(12) United States Patent
Kawano et al.

(10) Patent No.: US 6,259,181 B1
(45) Date of Patent: Jul. 10, 2001

(54) ROTOR CORE FOR RELUCTANCE MOTOR

(75) Inventors: Shinichiro Kawano; Hiroyuki Kiriyama; Yukio Honda; Hiroshi Sawada; Noriyoshi Nishiyama, all of Osaka (JP)

(73) Assignee: Matsushita Electric Industrial Co., Osaka (JP)

(*) Notice: Subject to any disclaimer, the term of this patent is extended or adjusted under 35 U.S.C. 154(b) by 0 days.

(21) Appl. No.: 09/635,849

(22) Filed: Aug. 11, 2000

Related U.S. Application Data

(62) Division of application No. 09/380,492, filed as application No. PCT/JP98/01020 on Mar. 11, 1998.

(30) Foreign Application Priority Data

Mar. 13, 1997 (JP) .................................................. 9-58955
Mar. 13, 1997 (JP) .................................................. 9-58956
Aug. 22, 1997 (JP) .................................................. 9-226044

(51) Int. Cl.[7] ........................... H02K 19/00; H02K 1/00; H02K 1/22
(52) U.S. Cl. ........................... 310/162; 310/216; 310/261
(58) Field of Search .................................... 310/162, 166, 310/168, 171, 216, 261, 266

(56) References Cited

U.S. PATENT DOCUMENTS 3,721,844 * 3/1973 Fong ..................................... 310/166
5,818,140 * 10/1998 Vagati .................................. 310/185
5,903,080 * 5/1999 Nashiki et al. ....................... 310/168

FOREIGN PATENT DOCUMENTS 10 43 488    4/1959  (DE) .
0 289 075   11/1988  (EP) .
7-274460    10/1995  (JP) .
96/42132    12/1996  (WO) .

OTHER PUBLICATIONS

A. Vagati: "The Synchronous Reluctance Solution: A New Alternative in A.C. Drives", Proceedings of the International Conference of Industrial Electronic Control and Instrumentation, vol. 1, No. Conf. 20, 5–9, Sep. 1994, pp. 1–13 XP000528562.

Yukio Honda et al., "Development of Multi–Flux Barrier Type Synchronous Reluctance Motor", in Proceedings No. 1029 published on Mar. 10, 1996 for a national meeting 1996 of the Electrical Society of Japan, together with a partial English translation thereof.

* cited by examiner

Primary Examiner—Nestor Ramirez
Assistant Examiner—Dang Dinh Le
(74) Attorney, Agent, or Firm—Wenderoth, Lind & Ponack, L.L.P.

(57) ABSTRACT

This invention pertains to a rotor core (6) in which a plurality of core sheets (1) are laminated on one another on a rotor shaft (4). A plurality of slits (3, 7) and a plurality of strips (2) are alternately arranged in a radial direction of each of the core sheets (1) so as to convexly confront a center of each of the core sheets (1) such that an outer peripheral rim (10) is formed between an outer peripheral edge of each of the core sheets (1) and each of opposite ends of each of the slits (3, 7). A stress concentration portion (11) which is provided at a portion (10*a*) of the outer peripheral rim (10) and has a width (L1) larger than that of the remaining portions of the outer peripheral rim (10).

35 Claims, 21 Drawing Sheets

ROTOR CORE FOR RELUCTANCE MOTOR

This application is a Divisional application of Ser. No. 09/380,492, filed Nov. 23, 1999, which is a 371 of PCT/JP98/01020, Filed Mar. 11, 1999.

TECHNICAL FIELD

The present invention relates to a construction of a rotor core of a reluctance motor utilizing reluctance torque.

BACKGROUND ART

Thanks to an advantage that secondary copper loss of a rotor is not produced in contrast with an induction motor, the reluctance motor attracts considerable attention as a driving motor for an electric vehicle, a machine tool or the like. However, this reluctance motor generally has poor power-factor and thus, requires improvement of the construction of the rotor core, a driving method, etc. in order to be used for industrial purpose. In recent years, a technology for improving the power-factor by providing flux barriers in a plurality of rows on a core sheet of the rotor core sheet of the rotor core has been developed as described in a paper entitled "Development of Multi-Flux Barrier Type Synchronous Reluctance Motor" by Yukio Honda et al. in Proceedings No. 1029 published on Mar. 10, 1996 for a national meeting 1996 of the Electrical Society of Japan.

FIGS. 31 to 33 show an example of a construction of a rotor core of this improved known reluctance motor. In FIG. 31, a plurality of arcuate flux barriers 162 are provided on a circular core sheet 161 formed from by an electromagnetic steel plate so as to convexly confront an axis 163 of the core sheet 161. Each of the flux barriers 162 comprises a through-slit of about 1 mm in width, and is formed by a press. In order to impart strength to the core sheet 161 against centrifugal force applied to the core sheet 161 during its rotation, an outer peripheral rim 164 having a predetermined width is provided at an outer periphery of the core sheet 161.

By laminating several tens of the core sheets 161 on one another on a rotor shaft 165, a rotor core 166 is obtained as shown in FIG. 32. If this rotor core 166 is set in a stator 167 as shown in FIG. 33, a rotational magnetic field is given to the rotor core 166 by a plurality of field portions 168 of the stator 167 and thus, a reluctance torque T is produced. This reluctance torque T is expressed by the following formula (1).

$$T=Pn(Ld-Lq)id \times iq \qquad (1)$$

In the above formula (1), "Pn" denotes the number of pairs of poles, "Ld" denotes a direct-axis inductance, "Lq" denotes a quadrature-axis inductance, "id" denotes a direct-axis current and "iq" denotes a quadrature-axis current. It is seen from the above formula (1) that performance of the reluctance motor relies on magnitude of (Ld−Lq). In order to increase (Ld−Lq), it has been a general practice that the above mentioned flux barriers 162 formed by the slits are provided on the core sheet 161 so as to impart resistance to a quadrature-axis magnetic path traversing the slits, while a direct-axis magnetic path interposed between the slits is secured.

In the above construction of the known rotor core 166, the slits each having a width of about 1 mm are formed on the core sheet 161 by a press, and a strip is provided between neighboring ones of the slits such that the strips are coupled with each other at a predetermined width by the outer peripheral rim 164.

However, in this construction of the known rotor core 166, since the quadrature-axis magnetic flux penetrates each slit, the value of the quadrature-axis inductance Lq is increased and thus, the reluctance torque T decreases. On the contrary, if the width of each slit is increased so as to lessen the quadrature-axis magnetic flux, the width of each strip is also reduced, so that the value of the direct-axis inductance Ld is reduced and thus, the value of the reluctance torque T also decreases.

Meanwhile, in the construction of the known rotor core 166, if the number of revolutions of the motor is increased, stress concentration may result, via centrifugal force, in the vicinity of radially inner slits of the core sheet 161, especially at the outer peripheral rim 164 at a radially innermost slit of the core sheet 161. This possibly resulting in deformation of the rotor core 166.

Large stress is applied to the outer peripheral rim 164 at the radially inner slits of the core sheet 161 for the following reason. The radially outer strips of the core sheet 161, which are supported by the outer peripheral rim 164, are short in length and thus, are light in weight. However, the radially inner strips of the core sheet 161, which are supported by the outer peripheral rim 164, become gradually larger in length and thus, become gradually heavier in weight. Therefore, centrifugal force produced by rotation of the rotor core 166 becomes gradually larger towards the radially innermost slit of the core sheet 161 along the outer peripheral rim 164. Furthermore, by driving the rotor core 166 for its rotation, the strips projecting towards the center of the rotor core 166 are urged out of the rotor core 166. As a result, the strips projecting towards the center of the rotor core 166 would depress the outer peripheral rim 164 outwardly so as to project out of the rotor core 166. At this time, the strips become larger in size towards the radially innermost slit of the core sheet 161 along the outer peripheral rim 164 and therefore, produce larger force for depressing the outer peripheral rim 164 outwardly. Therefore, as location on the core sheet 161 approaches the stress concentration portions on the outer peripheral rim 164 at the radially innermost slit of the core sheet 161, force for deforming the rotor core 166 becomes extraordinarily larger.

Hence, if width of the outer peripheral rim 164 is increased so as to prevent deformation of the rotor core 166 even at the time of high-speed rotation of the rotor core 166, the outer peripheral rim 164 coupling the strips with each other is not subjected to magnetic saturation. Therefore, since quadrature-axis magnetic flux leaks through the outer peripheral rim 164, the quadrature-axis inductance Lq becomes large and thus, the rotor core 166 cannot be driven for its rotation efficiently.

BRIEF DESCRIPTION OF THE INVENTION

Accordingly, the present invention has for its object to provide, with a view to eliminating the drawbacks of conventional rotor cores, a rotor core which is driven for its rotation by sufficient reluctance torque so as to improve performance of a motor.

In order to accomplish this object, the present invention provides a rotor core in which a plurality of core sheets are laminated on one another on a rotor shaft and a plurality of slits and a plurality of strips are alternately arranged in a radial direction of each of the core sheets so as to convexly confront a center of each of the core sheets such that an outer peripheral rim is formed between an outer peripheral edge of each of the core sheets and each of opposite ends of each of the slits. The rotor core comprises a stress concentration portion which is provided at a portion of the outer peripheral rim, and has a width larger than that of the remaining portions of the outer peripheral rim.

By this arrangement of the rotor core of the present invention, since the portion of the outer peripheral rim for the stress concentration portion subjected to large centrifugal force has the large width, a rotor is not deformed even during high-speed rotations. Furthermore, since the remaining portions of the outer peripheral rim are made thin, magnetic flux flowing therethrough is saturated, so that durability of the rotor can be secured without lowering a ratio of a direct-axis inductance Ld to a quadrature-axis inductance Lq, i.e., (Ld/Lq).

This object and features of the present invention will become clear from the following description taken in conjunction with the preferred embodiments thereof with reference to the accompanying drawings throughout which like parts are designated by like reference numerals.

DESCRIPTION OF THE PREFERRED EMBODIMENT

Hereinafter, preferred embodiments of the present invention are described with reference to the accompanying drawings.

(First Embodiment)

Figure 1:
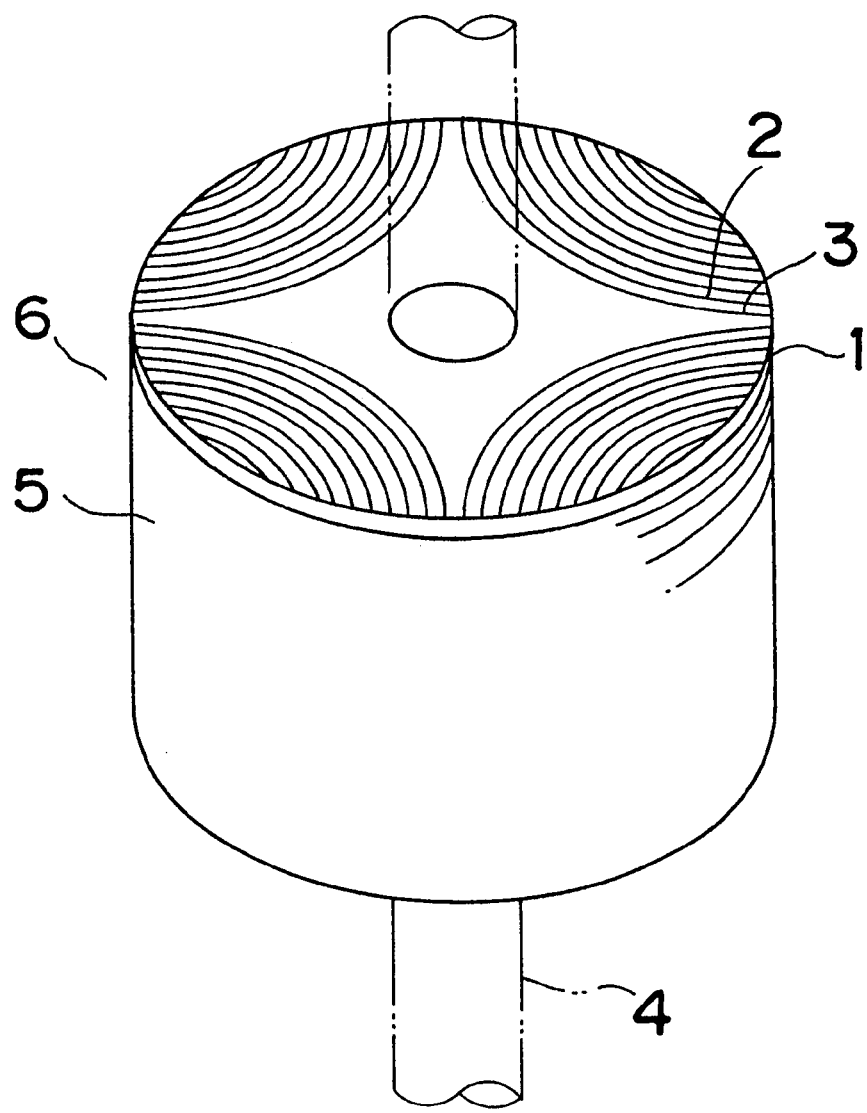
FIG. 1 is a perspective view of a rotor core according to a first embodiment of the present invention.
Figure 2:
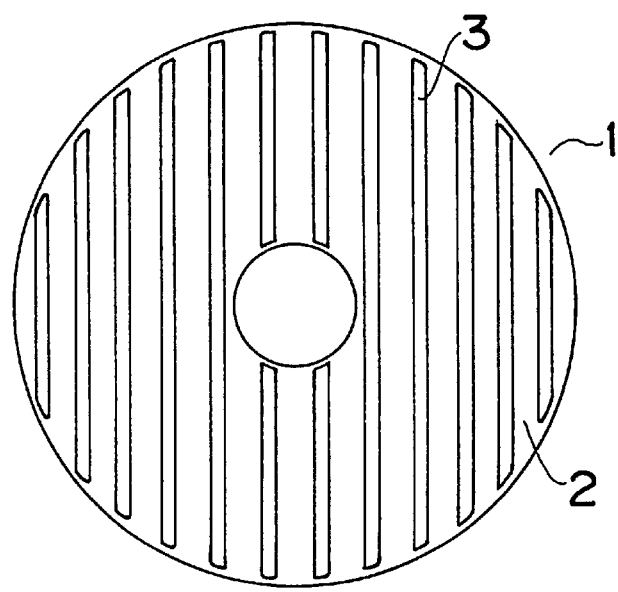
FIG. 2 is a top plan view of a core sheet of a rotor core which is a first modification of the rotor core of FIG. 1.
Figure 3:
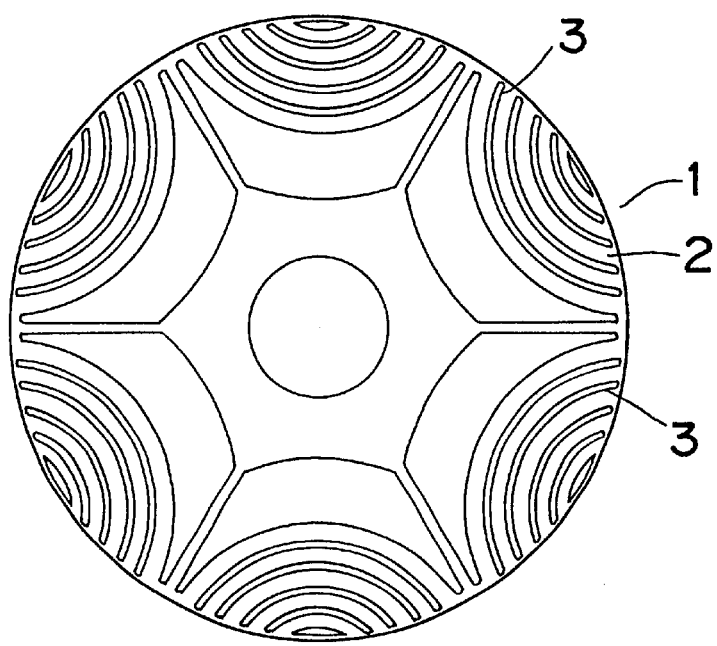
FIG. 3 is a top plan view of a core sheet of a rotor core which is a second modification of the rotor core of FIG. 1.

In FIG. 1, a circular core sheet 1 is formed from an electromagnetic steel plate having high permeability. A plurality of arcuate slits 3 are arranged in a radial direction of the core sheet 1 at each of four circumferentially identically spaced locations of the core sheet 1, so as to convexly confront a center of the core sheet 1 such that a strip 2 is interposed between neighboring ones of the slits 3. It is to be noted that the slits 3 may also be provided in parallel with each other as shown in FIG. 2. In addition, the slits 3 may also be provided at six circumferentially identically spaced locations as shown in FIG. 3, or at eight circumferentially identically spaced locations of the core sheet 1. This core sheet 1 is formed by utilizing a press or a laser. In view of shape of magnetic paths of the core sheet 1, and working of the core sheet 1, it is preferable that the strips 2 are formed arcuately. However, the strips 2 may be, needless to say, formed into a V-shaped or a U-shaped configuration. Then, after several tens of the core sheets 1 have been laminated on one another so as to obtain a laminated body 5, a rotor shaft 4 is inserted through the laminated body 5 and thus, a rotor core 6 is obtained. The core sheets 1 of the laminated body 5 are integrally attached to each other by adhesive, etc.

If the thus obtained rotor core 6 is set in a stator (not shown), a rotational magnetic field is supplied to the rotor core 6 by field portions formed by a plurality of teeth of the stator and thus, reluctance torque is produced. Namely, in a reluctance motor having this rotor core 6, a quadrature-axis inductance Lq traversing the strips 2, and a direct-axis inductance Ld extending along the strips 2 are compared with each other as follows. Namely, since resistance is imparted to a quadrature-axis magnetic path by the slits 3, since each is formed by an air layer whose permeability is about 1/1000 of that of the electromagnetic steel plate, a quadrature-axis magnetic flux hardly passes through the slits 3 and thus, the quadrature-axis inductance Lq decreases. On the other hand, since a direct-axis magnetic path is formed by the strips 2, a direct-axis magnetic flux readily passes through the strips 2 and thus, the direct-axis inductance Ld increases.

Meanwhile, conventionally, even if a plurality of such slits 3 are provided, such a phenomenon has happened in which just a bit of the quadrature-axis magnetic flux passes through the slits 3. Thus, it may be considered that the quadrature-axis magnetic flux is lessened by increasing the width of each of the slits 3. However, in this case, width of each of the strips 2 decreases and thus, flow of the direct-axis magnetic flux is reduced. Furthermore, even if a trial of increasing both the width of each of the strips 2 and the width of each of the slits 3 is made, the width of each of the strips 2 will decrease, thereby resulting in reduction of flow of the direct-axis magnetic flux.

Figure 4:
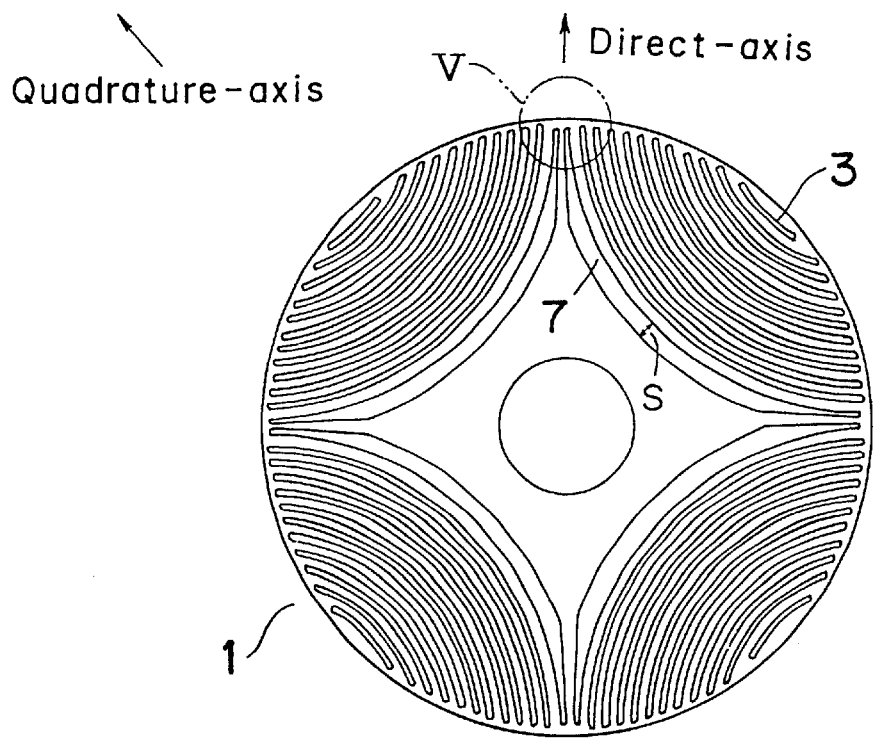
FIG. 4 is a top plan view of a core sheet of the rotor core of FIG. 1.
Figure 5:
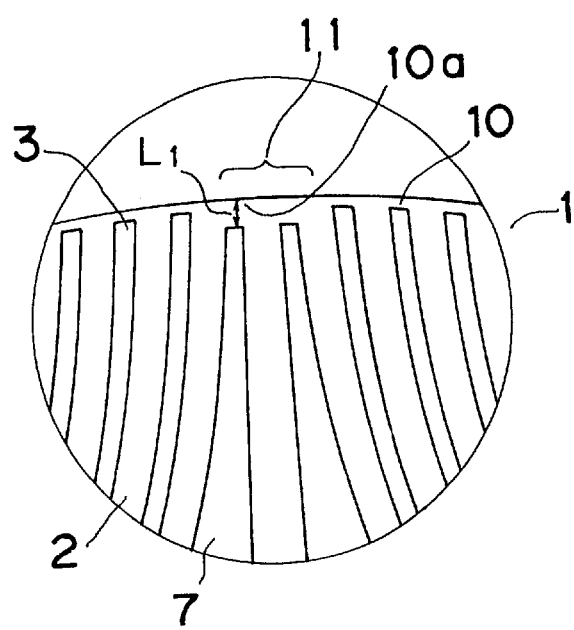
FIG. 5 is an enlarged view of an encircled portion V in FIG. 4.

Therefore, in this first embodiment, an arcuate large slit 7 having a width S larger than that of the slits 3 is provided radially inwardly of a radially innermost one of the slits 3 so as to act as an interceptor for the quadrature-axis magnetic flux as shown in FIGS. 4 and 5. The large slit 7 has a length substantially the same as that of a longest one of the slits 3, i.e., the radially innermost slit 3. It is preferable that the width S of the large slit 7 is not less than 1.2 times that of the slits 3.

The radially innermost slit 3 is referred to as a "first slit 3" and the remaining slits 3 are referred to as a "second slit 3", a "third slit 3" and so on sequentially radially outwardly from the first slit 3. Therefore, for example, the second slit 3 is disposed next to and radially outwardly of the first slit 3, while the third slit 3 is disposed next to and radially outwardly of the second slit 3.

FIG. 5 shows an outer peripheral portion of the core sheet 1. An outer peripheral rim 10 is provided between an outer peripheral edge of the core sheet 1 and each of opposite ends of each of the slits 3 and the large slit 7. The strips 2 are coupled with each other by only the outer peripheral rim 10. The outer peripheral rim 10 includes a first outer peripheral rim portion 10a between the outer peripheral edge of the core sheet 1 and each of opposite ends of the large slit 7. When the rotor core 6 is rotating, stress due to centrifugal force is applied to the outer peripheral rim 10. This stress becomes larger towards a radially innermost one of the strips 2 on the following grounds. Namely, a mass of a radially inner strip 2 supported by its outer peripheral rim portions is larger than that of a radially outer strip 2 supported by its outer peripheral rim portions. Furthermore, since each strip 2 is pulled radially outwardly upon rotation of the rotor core 6, the first outer peripheral rim portion 10a of the large slit 7 having the largest length is strongly depressed radially outwardly. Therefore, since a maximum, stress is applied to the first outer peripheral rim portion 10a, a stress concentration portion 11 is formed by the first outer peripheral rim portion 10a.

Figure 6:
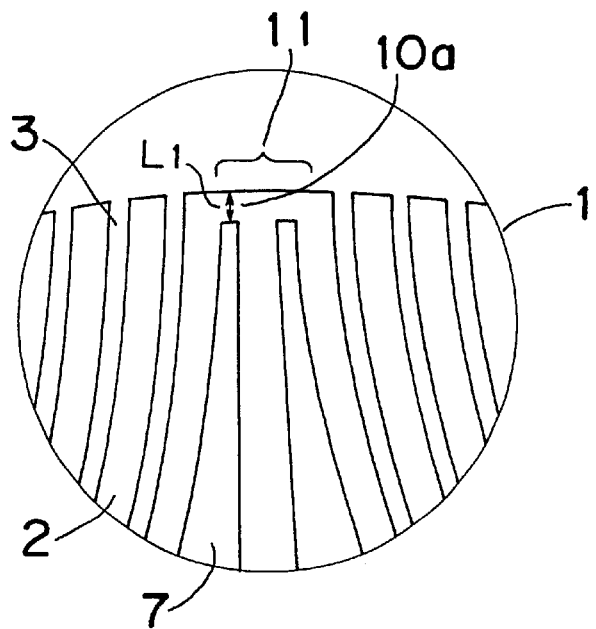
FIG. 6 is a view similar to FIG. 5, particularly showing its modification.

Accordingly, width of the outer peripheral rim 10 is uniform except for the stress concentration portion 11, but is increased to L1 at the stress concentration portion 11. Since the width L1 of the first outer peripheral rim portion 10a, i.e., the stress concentration portion 11 is made larger than that of the remaining portions of the outer peripheral rim 10, it is possible to rotate the rotor core 6 at high speed. Namely, centrifugal force produced by rotation of the rotor core 6 becomes larger towards the center of the rotor core 6. However, even if stress concentration occurs in the stress concentration portion 11, the stress concentration portion 11 has the width L1 larger than that of the remaining portions of the outer peripheral rim 10 and thus, can withstand centrifugal force based on high-speed rotation of the rotor core 6. It is preferable that the width L1 of the first outer peripheral rim portion 10a is not less than 1.5 times that of the remaining portions of the outer peripheral rim 10. As shown in FIG. 6, the outer peripheral rim 10 may be eliminated except for the first outer peripheral rim portion 10a of the large slit 7 for the stress concentration portion 11, such that the slits 3 open to the outer peripheral edge of the core sheet 1. In this case, a bridge portion (not shown) for coupling neighboring ones of the strips 2 should be provided on each slit 3 in order to prevent the strips 2 from being separated from the core sheet 1.

Meanwhile, since centrifugal force applied to portions of the outer peripheral rim 10, other than the stress concentration portion 11 upon rotation of the rotor core 6, is smaller than that applied to the stress concentration portion 11, width of the portions of the outer peripheral rim 10 other than the stress concentration portion 11 can be made smaller than the width L1 of the stress concentration portion 11. Hence, the width of the portions of the outer peripheral rim 10 other than the stress concentration portion 11 is not required to be increased in conformity with the maximum stress applied to the stress concentration portion 11. Thus, even if the width of the portions of the outer peripheral rim 10 other than the stress concentration portion 11 is made small as described above, magnetic flux does not leak between neighboring ones of the strips 2. Therefore, if the width of the portions of the outer peripheral rim 10, other than the stress concentration portion 11, is set at such a value as to cause magnetic saturation, a phenomenon in which the direct-axis magnetic flux flows in quadrature-axis direction via the outer peripheral rim 10 can be prevented by magnetic saturation.

Namely, the quadrature-axis magnetic flux does not flow in the quadrature-axis direction in each of the slits. However, since the large slit 7 is made wider than the slits 3, the quadrature-axis magnetic flux can be reduced further and thus, the quadrature-axis inductance Lq can be lessened. At this time, since the large slit 7 is disposed radially inwardly of the strips 2, width of each of the strips 2 is not reduced. Therefore, the direct-axis magnetic flux passes through each of the strips so as to flow in the direct-axis direction. In other words, value of the direct-axis inductance Ld does not decrease. Consequently, since a ratio of the direct-axis inductance Ld to a quadrature-axis inductance Lq, i.e., (Ld/Lq) increases, a reluctance torque T can be increased from the formula (1) referred to earlier.

Furthermore, since the strips 2 are coupled with each other by only the outer peripheral rim 10, the direct-axis magnetic flux flows through the strips 2 smoothly, so that leakage of the direct-axis magnetic flux is further lessened and thus, the ratio (Ld/Lq) is further increased.

Meanwhile, the width S of the large slit 7 is not less than three times the width of the slits 3, but is determined by the size of the rotor shaft 4. Therefore, if the rotor shaft 4 is smaller, the large slit 7 can be made further larger.

Meanwhile, a hollow may be formed at a center of the rotor core 6 so as to abut on the large slit 7 or resin may be filled into the hollow. In this case, the rotor shaft 4 cannot be inserted through the rotor core 6. Thus, a pair of clamping pieces may be, respectively, projected from opposed end faces of the rotor shaft 4 so as to confront each other such that opposite end portions of the rotor core 6 are gripped between the clamping pieces. By forming the hollow abutting on the large slit 7, the quadrature-axis inductance Lq of the rotor core 6 can be reduced further.

Meanwhile, if end portions of the large slit 7 are made as wide as a central portion of the large slit 7, a width of an input area for the direct-axis magnetic flux also decreases, thereby resulting in reduction of the direct-axis inductance Ld. Therefore, it is preferable that the large slit 7 is made especially wider than the end portions of the large slit 7. Furthermore, if the large slit 7 is extremely short, the quadrature-axis magnetic flux leaks from the first outer peripheral rim portion 10a, thus resulting in reduction of the ratio (Ld/Lq). Therefore, it is preferable that a length of the large slit 7 is not less than 0.9 times that of the longest one of the slits 3.

Figure 7:
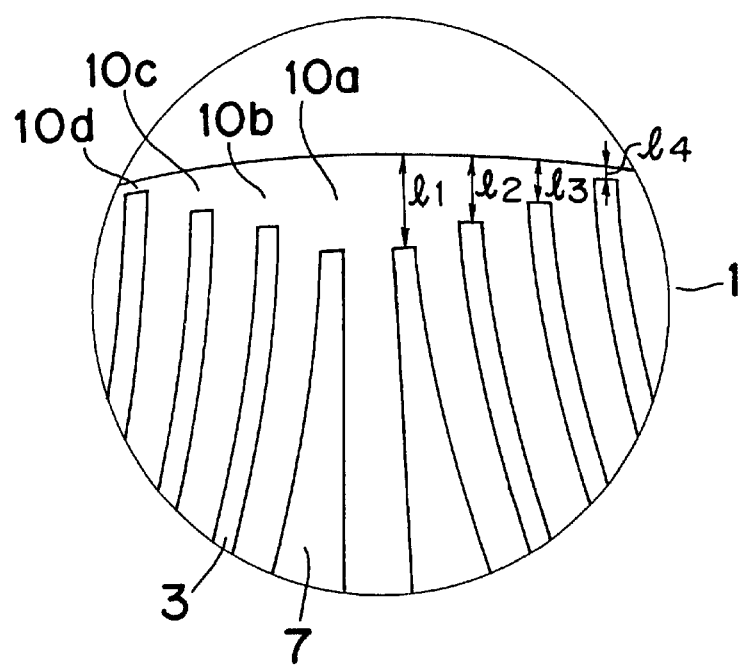
FIG. 7 is a view showing dimensions of the core sheet of FIG. 4 in experiments.
Figure 8:
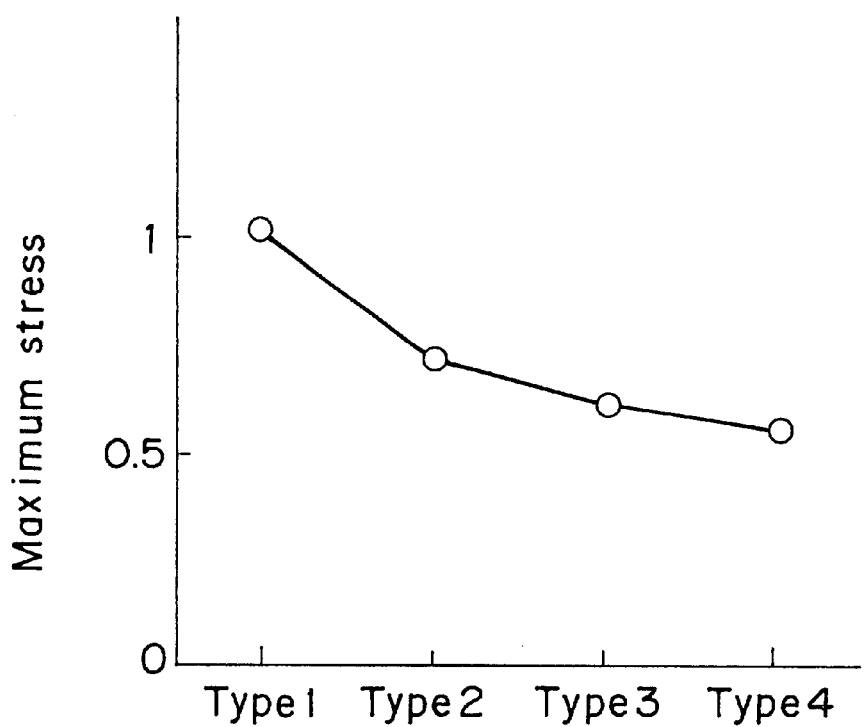
FIG. 8 is a graph showing results of the experiments of FIG. 7.

Experiments conducted by the present inventors have revealed relation between maximum stress applied to the rotor core 6 and width of the outer peripheral rim 10 as shown in FIGS. 7 and 8. As shown in FIG. 7, the outer peripheral rim 10 includes, in addition to the first outer peripheral rim portion 10a, a second outer peripheral rim portion 10b between the outer peripheral edge of the core sheet 1 and each of opposite ends of the radially innermost slit 3, i.e., the first slit 3, a third outer peripheral rim portion 10c between the outer peripheral edge of the core sheet 1 and each of opposite ends of the second slit 3 and a fourth outer peripheral rim portion 10d between the outer peripheral edge of the core sheet 1 and each of opposite ends of the third slit 3.

In FIG. 7, the first, second, third and fourth outer peripheral rim portions 10a, 10b, 10c and 10d have widths l1, l2, l3 and l4, respectively. The rotor cores 6 tested in the experiments have a diameter of 76.4 mm and are classified into four types, namely, a type 1 having a relation of (l1:l2:l3:l4=1:1:1:1), a type 2 having a relation of (l1:l2:l3:l4=1.8:1:1:1), a type 3 having a relation of (l1:l2:l3:l4=2.6:1.8:1:1) and a type 4 having a relation of (l1:l2:l3:l4=3.5:2.6:1:1). In the experiments, maximum stresses applied to the rotor cores 6 are compared with each other by rotating the rotor cores 6 at 600 r.p.m. It is to be noted that the term "maximum stress" represents a stress applied to a spot where centrifugal force produced by rotation of the rotor core 6 is concentrated.

As shown in FIG. 8, in the rotor core 6 of the type 1 in which the width of the outer peripheral rim 10 is uniform throughout, stress is concentrated upon the first outer peripheral rim portion 10a. If the widths l2, l3 and l4 of the second, third and fourth outer peripheral rim portions 10b, 10c and 10d are increased as in the rotor cores 6 of the types 2, 3 and 4, the stress is scattered. Therefore, in motors having an identical diameter and an identical rotational speed, maximum stress can be reduced by scattering stress. However, if the width of the outer peripheral rim 10 is increased excessively, the quadrature-axis magnetic flux is not saturated at the outer peripheral rim 10 and thus, flows in direct-axis direction. Therefore, in view of rotational speed of the rotor core 6, material of the core sheet 1 and the width of the outer peripheral rim 10, the stress concentration portion 11 may also be shifted to the first and second outer peripheral rim portions 10a and 10b, or the first to third outer peripheral rim portions 10a to 10c or more.

When this rotor core 6 is used in a motor, the motor can be rotated at high speed and at high torque. An electric vehicle, a compressor, an air-conditioner, etc. employing this motor is capable of yielding high output at high performance. The width of the outer peripheral rim 10 should be minimized with regard to magnetic saturation but cannot be reduced extremely with regard to stress applied to the outer peripheral rim 10. Therefore, when the rotor core 6 has a radius of 30 mm or more, it is preferable that the width of the outer peripheral rim 10 is not less than 0.2 mm. Meanwhile, when the rotor core 6 has a radius of 20 mm or more, it is preferable that the width of the outer peripheral rim 10 is not less than 0.1 mm.

It is preferable that the width L1 of the first outer peripheral rim portion 10a for the stress concentration portion 11 is larger than that of the remaining portions of the outer peripheral rim 10. However, when the quadrature-axis inductance Lq of the rotor core 6 is small, not more than about three of the remaining portions of the outer peripheral rim 10 may have a width larger than the width L1 of the first outer peripheral rim portion 10a.

Furthermore, if the slits 3 between the strips 2 in the core sheet 1 are sealed by, for example, resin, rotational strength of the core sheet 1 can be further increased without providing bridge portions on the core sheet 1. Other materials having low permeability, e.g., aluminum and hard rubber may also be used as sealer.

Since secondary copper loss is not produced in a rotor of a motor employing such a rotor core, this motor can be rotated at high speed and therefore, is suitable for use in a compressor, an air-conditioner, a refrigerator and an electric vehicle, especially, an electric vehicle in which special priority is given to safety.

(Second Embodiment)

Figure 9:
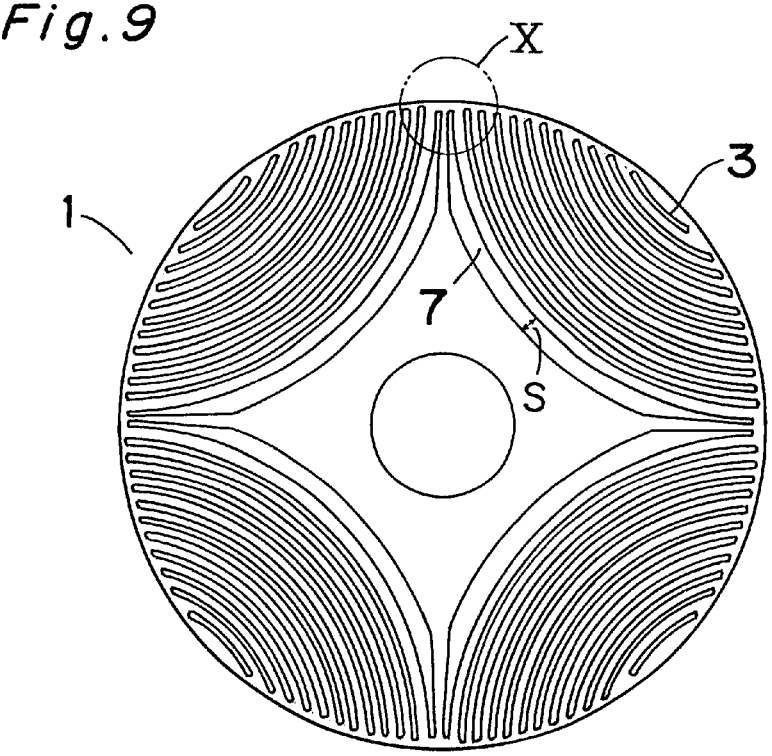
FIG. 9 is a top plan view of a core sheet of a rotor core according to a second embodiment of the present invention.
Figure 10:
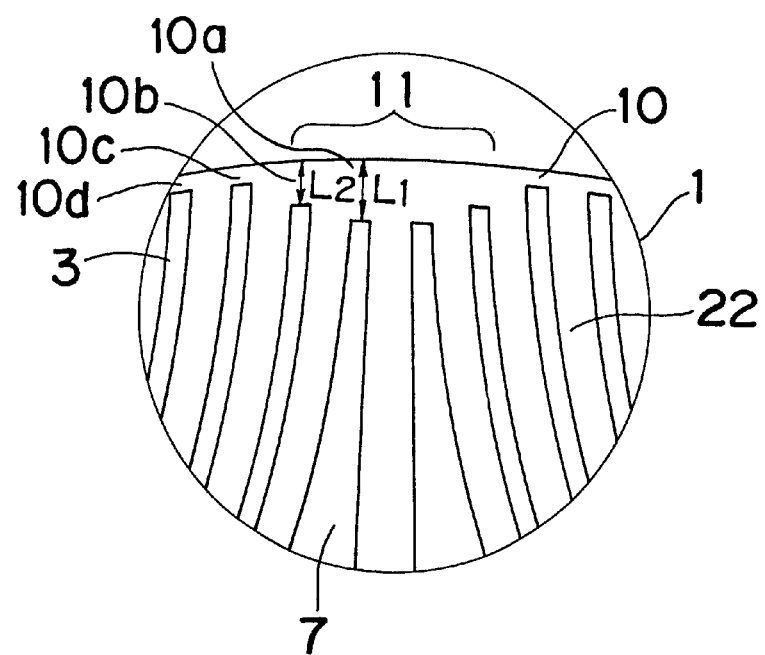
FIG. 10 is an enlarged view of an encircled portion X in FIG. 9.

FIGS. 9 and 10 show a core sheet 1 of a rotor core 6 according to a second embodiment of the present invention. As shown in FIG. 10, width of the outer peripheral rim 10 is uniform except for the first and second outer peripheral rim portions 10a and 10b, and is increased to L1 and L2 at the first and second outer peripheral rim portions 10a and 10b, respectively, such that the stress concentration portion 11 is formed by the first and second outer peripheral rim portions 10a and 10b. The width L1 of the first outer peripheral rim portion 10a is larger than the width L2 of the second outer peripheral rim portion 10b. By forming the stress concentration portion 11 from the first and second outer peripheral rim portions 10a and 10b, and having the widths L1 and L2 be larger than the width of the remaining portions of the outer peripheral rim 10 as described above, the stress concentration portion 11 can withstand centrifugal force produced by high-speed rotation of the rotor core 6. Meanwhile, since the width of portions of the outer peripheral rim 10 other than the stress concentration portion 10 is smaller than the widths L1 and L2 of the stress concentration portion 11, magnetic flux is saturated at the outer peripheral rim 10 and therefore, does not flow through the outer peripheral rim 10. Since other constructions of the core sheet 1 of the second embodiment are similar to those of the core sheet 1 of the first embodiment, the description is abbreviated for the sake of brevity.

Figure 11:
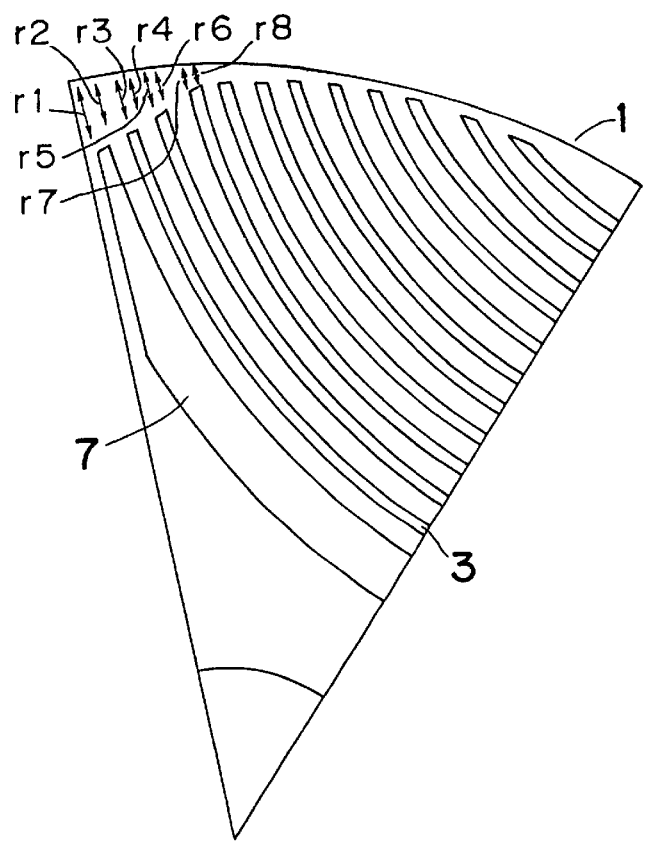
FIG. 11 is a fragmentary top plan view of the core sheet of FIG. 9.

Meanwhile, in FIG. 10, assuming that the width L1 of the first outer peripheral rim portion 10a has a radially innermost dimension r1 and a radially outermost dimension r2, the width L2 of the second outer peripheral rim portion 10b has a radially innermost dimension r3 and a radially outermost dimension r4, the width of the third outer peripheral rim portion 10c has a radially innermost dimension r5 and a radially outermost dimension r6, the width of the fourth outer peripheral rim portion 10d has a radially innermost dimension r7 and a radially outermost dimension r8 and so on as shown in FIG. 11, the radially innermost dimension r1 is equal to the radially outermost dimension r2 and the radially innermost dimension r3 is equal to the radially outermost dimension r4. Similarly, radially innermost dimensions and radially outermost dimensions of the widths of the remaining outer peripheral rim portions are equal to each other. Namely, the relation of (r1=r2>r3=r4>r5=r6=r7 - - - ) is formed. However, as shown in FIG. 11, the relation of (r1>r2>r3>r4>r5=r6=r7 - - - ) may also be established.

Figure 12:
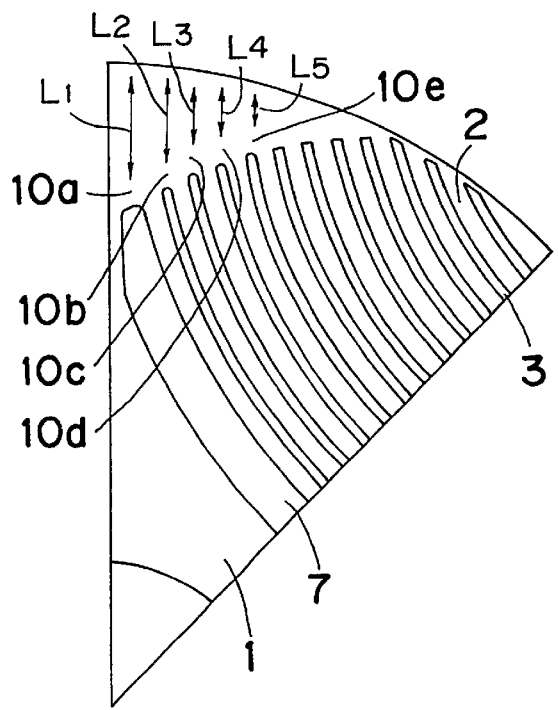
FIG. 12 is a further fragmentary top plan view of the core sheet of FIG. 9.

Furthermore, in the second embodiment, the widths L1 and L2 of the stress concentration portion 11 are made larger than that of the remaining portions of the outer peripheral rim 10. However, in FIG. 12, assuming that the third outer peripheral rim portion 10c has a width L3, the fourth outer peripheral rim portion 10d has a width L4, a fifth outer peripheral rim portion 10e has a width L5 and so on, a relation of (L1>L2>L3>L4 - - - ) may also be formed. Alternatively, a relation of (r1≧r2≧r3≧r4≧r5≧r6 - - - ) may also be established. Meanwhile, if end portions of the large slit 7 and the slits 3 are rounded as shown in FIG. 12, strength of the large slit 7 and the slits 3 can be increased. To this end, end portions of the large slit 7 and the radially innermost slit 3 corresponding to the stress concentration portion 11 may also be rounded.

(Third Embodiment)

Figure 13:
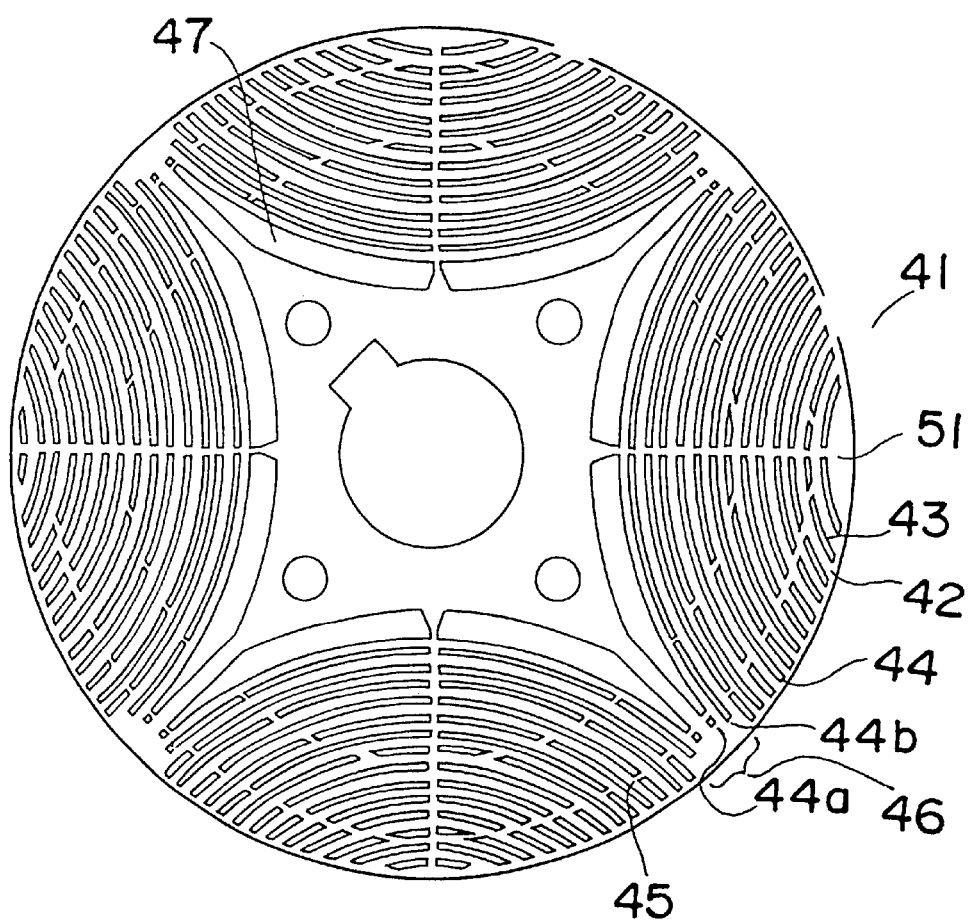
FIG. 13 is a top plan view of a core sheet of a rotor core according to a third embodiment of the present invention.

FIG. 13 shows a core sheet 41 in which a plurality of arcuate slits 43 are arranged radially so as to convexly confront a center of the core sheet 41 such that a strip 42 is interposed between neighboring ones of the slits 43. A large slit 47 having a width larger than that of the slits 43, is provided radially inwardly of a radially innermost one of the slits 43.

An outer peripheral rim 44 includes a first outer peripheral rim portion 44a between an outer peripheral edge of the core sheet 41 and each of opposite ends of the large slit 47, and a second outer peripheral rim portion 44b between the outer peripheral edge of the core sheet 41 and each of opposite ends of the radially innermost slit 43. The width of the outer peripheral rim 44 is uniform except for the first and second outer peripheral rim portions 44a and 44b, and is increased at the first and second outer peripheral rim portions 44a and 44b such that a stress concentration portion 46 is formed by the first and second outer peripheral rim portions 44a and 44b.

Furthermore, a bridge portion 45 for coupling neighboring ones of the strips 42 is provided in the slit 43 between the neighboring strips 42. Since the width of the outer peripheral rim 44 is increased at the stress concentration portion 46 and the bridge portions 45 are provided as described above, strength of the core sheet 41 is increased. Therefore, even if centrifugal force is produced by high-speed rotation of a rotor core formed by the core sheets 41, the rotor core can withstand the centrifugal force.

More specifically, the strips 42 and the bridge portions 45 are coupled with each other such that a zigzag magnetic path is formed by the strips 42 and the bridge portions 45 when the core sheet 41 is excited. To this end, an interval of the bridge portions 45 of each slit 43 is increased gradually as each slit 43 lies closer to the center of the core sheet 41. In addition, when two of the slits 43 lie next to each other, the bridge portions 45 of one of the two slits 43 are offset from those of the other of the two slits 43 such that the bridge portions 45 occupy corresponding positions on every other slit 43 alternately. As a result, rotational strength of the core sheet 41 can be secured. In addition, since a quadrature-axis magnetic path produced in the core sheet 41 when the core sheet 41 is excited, can be made thinner and longer, resistance against the quadrature-axis magnetic path can be increased.

At this time, if the zigzag magnetic path referred to above is formed in one core sheet 41, resistance against the quadrature-axis magnetic path can be increased by lengthening the quadrature-axis magnetic path on a plane. However, such a case may exist in which the zigzag magnetic path is not formed due to magnetic saturation. In this case, if the zigzag magnetic path is formed in an axial direction of the rotor shaft by laminating the core sheets 41 in the axial direction of the rotor shaft, the magnetic path is least likely to be saturated, so that the zigzag magnetic path can be formed in three dimensions and thus, resistance against the quadrature-axis magnetic path can be increased by lengthening the quadrature-axis magnetic path.

Furthermore, if the bridge portions 45 are formed such that a width of the bridge portions 45 is smaller than that of the strips 42, the quadrature-axis magnetic path can be thinned. Also in this case, since resistance against the quadrature-axis magnetic path is increased, the same effects as those mentioned above can be gained. If the bridge portions 45 are formed such that the width of the, bridge portions 45 is increased gradually towards the center of the core sheet 41, it is possible to secure strength corresponding to distribution of centrifugal force produced at the time of rotation of the core sheet 41.

Figure 14:
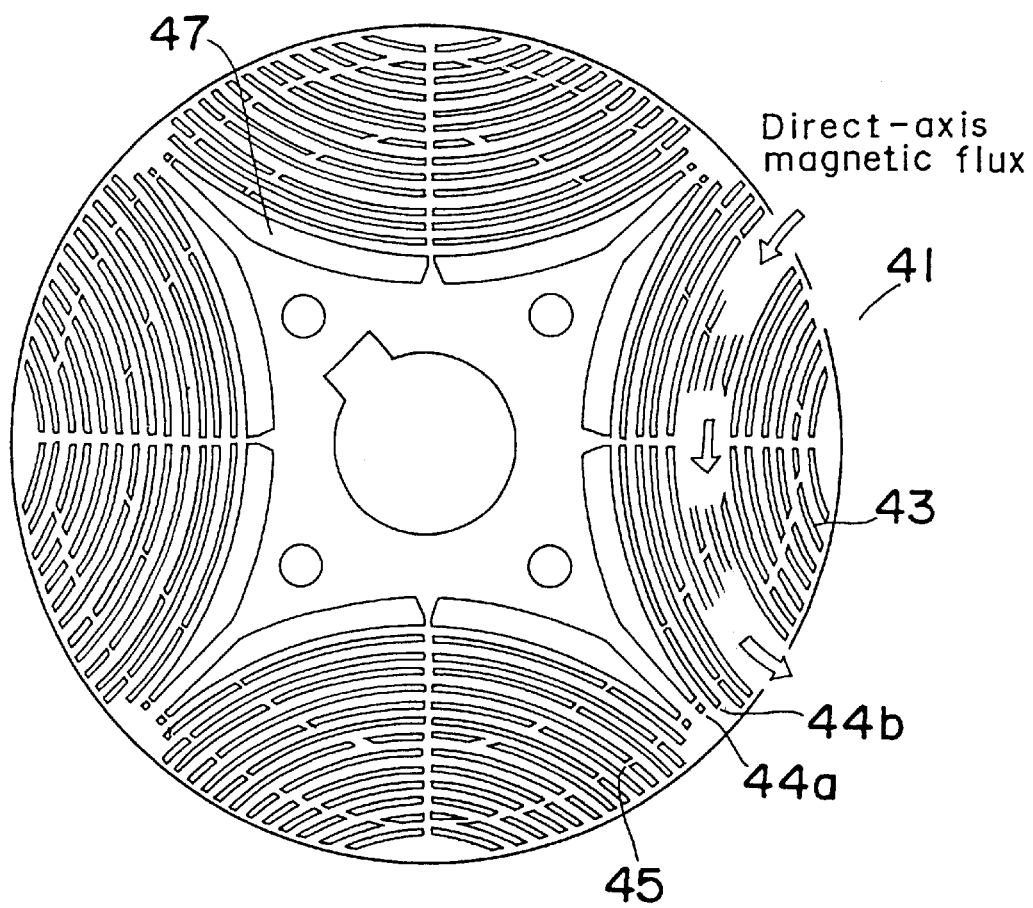
FIG. 14 is a view explanatory of a direct-axis magnetic path in the core sheet of FIG. 13.
Figure 15:
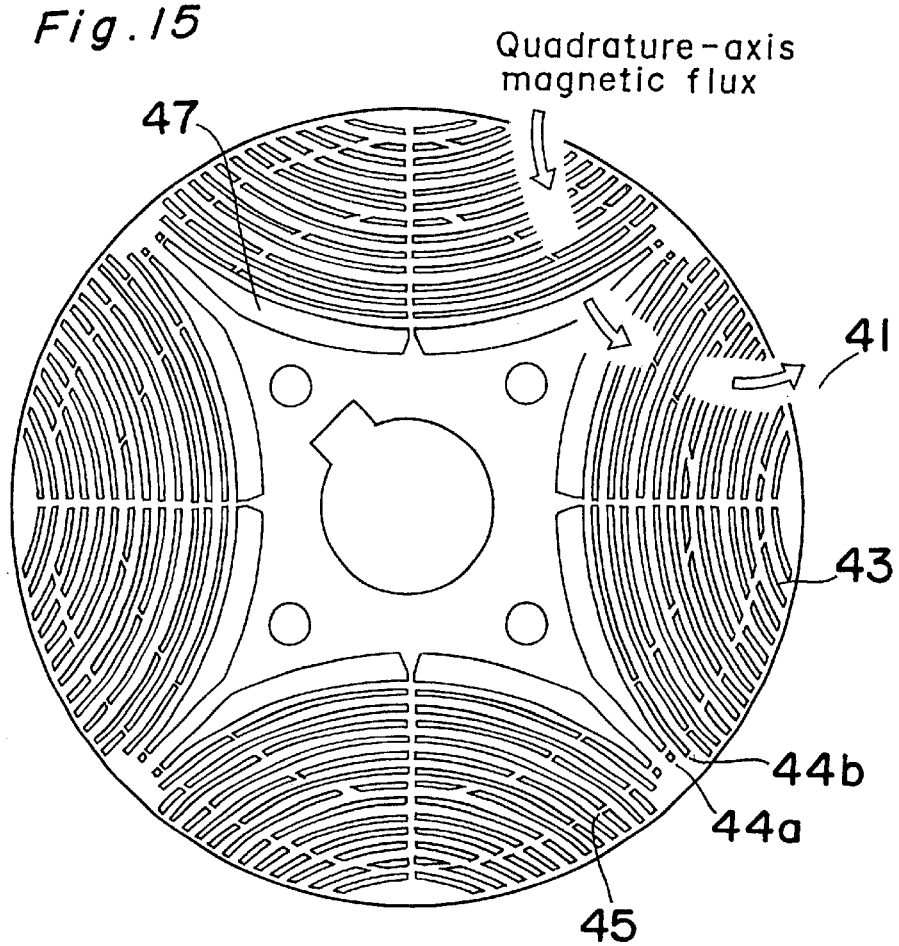
FIG. 15 is a view explanatory of a quadrature-axis magnetic path in the core sheet of FIG. 13.

FIG. 14 shows a direct-axis magnetic path produced in the core sheet 41 when the core sheet 41 is excited. It is apparent from FIG. 14 that substantially no direct-axis magnetic path is produced at the large slit 47 disposed between the center of the core sheet 41 and a radially innermost one of the strips 42. On the other hand, as shown in FIG. 15, the quadrature-axis magnetic path is formed so as to be converged upon the large slit 47. Therefore, if the core sheet 41 is formed such that the width of the large slit 47 is larger than that of the slits 43 as described above, almost only the quadrature-axis magnetic path traverses the large slit 47, so that only resistance against the quadrature-axis magnetic path can be increased almost without affecting resistance against the direct-axis magnetic path and thus, greater effects can be achieved.

Figure 16:
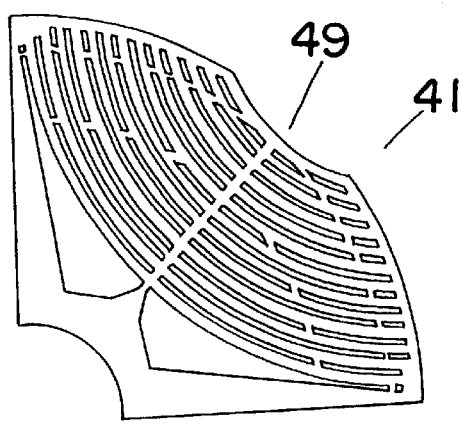
FIG. 16 is a fragmentary top plan view of a first modification of the core sheet of FIG. 13.

Moreover, it is seen from FIG. 14 that in the core sheet 41, the direct-axis magnetic path produced at an outer peripheral portion in quadrature-axis direction is quite small as compared with that produced at an inner peripheral portion in quadrature-axis direction. Therefore, if the outer peripheral portion of the core sheet 41 in quadrature-axis direction is removed from the core sheet 41 as a recess 49 as shown in FIG. 16, almost only the quadrature-axis magnetic path passes through the recess 49, so that only resistance against the quadrature-axis magnetic path can be increased almost without affecting resistance against the direct-axis magnetic path and thus, greater effects can be gained.

Figure 17:
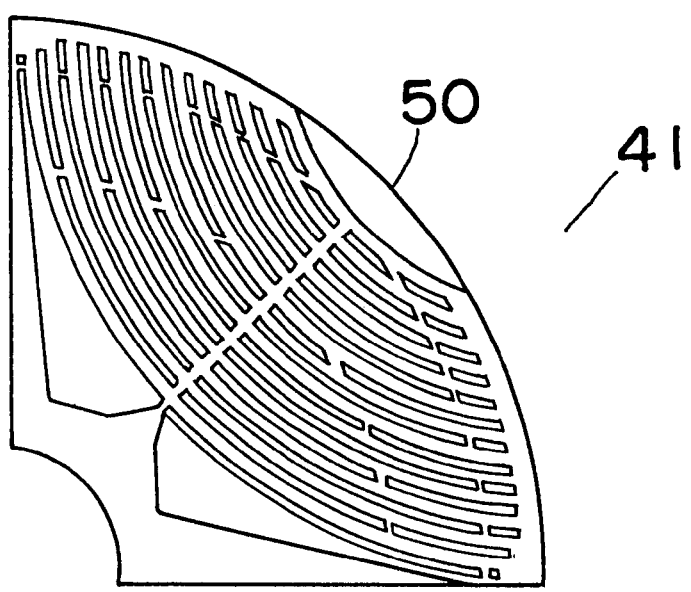
FIG. 17 is a fragmentary top plan view of a second modification of the core sheet of FIG. 13.
Figure 18A:
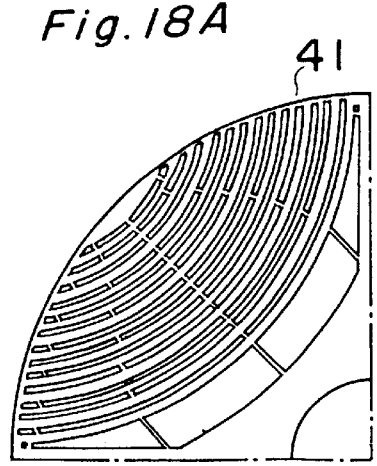
FIGS. 18A to 18F are fragmentary top plan views showing concrete examples of the core sheet of FIG. 13.
Figure 18D:
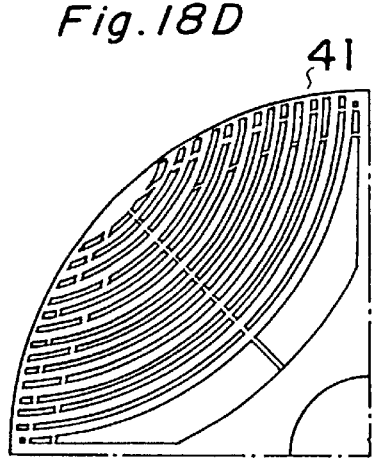
Figure 18B:
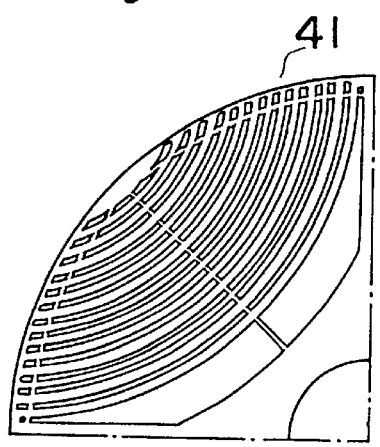
Figure 18E:
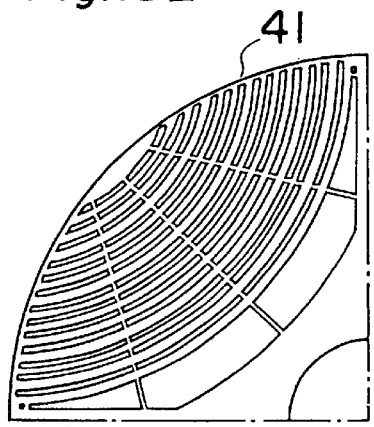
Figure 18C:
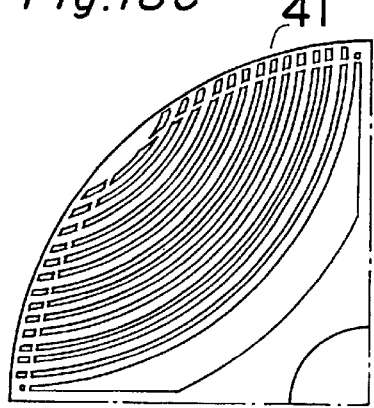
Figure 18F:
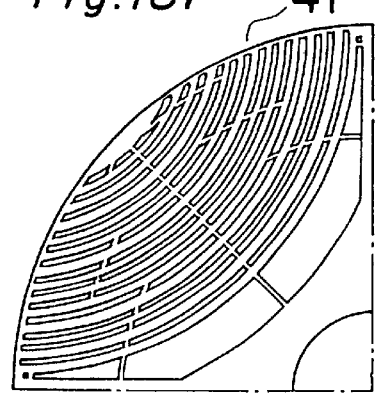
Figure 31:
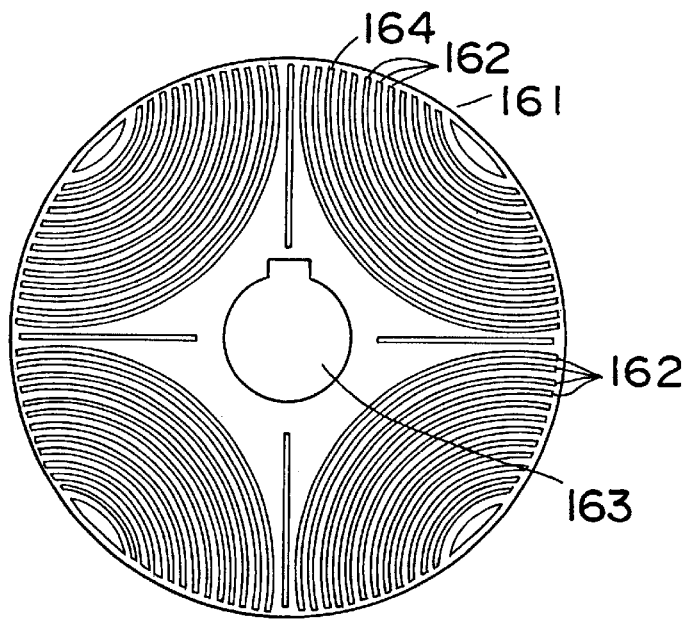
FIG. 31 is a top plan view of a core sheet of a prior art rotor core.
Figure 32:
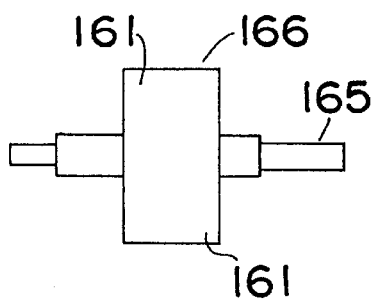
FIG. 32 is a front elevational view of the prior art rotor core of FIG. 31.
Figure 33:
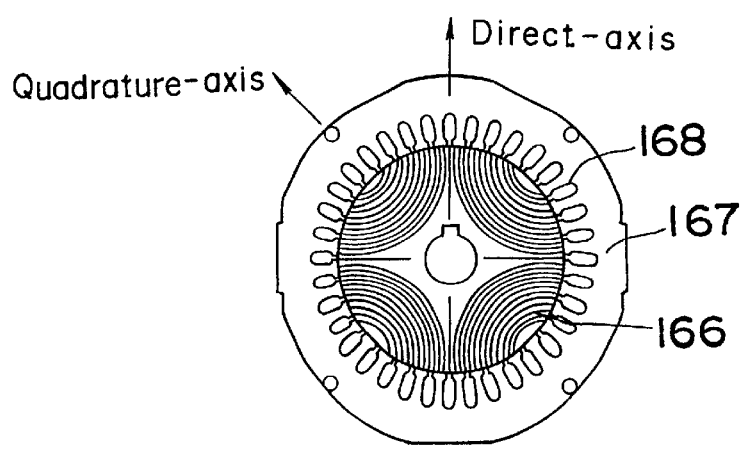
FIG. 33 is a side elevational view of the prior art rotor core of FIG. 31 set in a stator.

However, if the recess 49 is replaced by an outer peripheral portion 50 as shown in FIG. 17, a quite small portion of the direct-axis magnetic path, which is formed in the recess 49, can be recovered by the outer peripheral portion 50, so that resistance against the direct-axis magnetic path can be lessened slightly. Since this outer peripheral portion 50 is not a reinforcing member as is an outer peripheral rim 164 of a conventional core sheet 161 as depicted in FIG. 31, it is desirable that a radial width of the outer peripheral portion 50 be reduced to a minimum limited by working.

In addition, in order to secure strength of the core sheet 41 against centrifugal force produced by rotation of the core sheet 41, it is desirable that bridge portions 51 are arranged in quadrature-axis direction so as to couple the strips 42 with each other rectilinearly as shown in FIG. 13.

Meanwhile, if the bridge portions 45 disposed at an inner periphery of the core sheet 41 are made thicker than those disposed at an outer periphery of the core sheet 41, mass of the bridge portions 45 is reduced towards the outer periphery of the core sheet 41 and thus, the core sheet 41 is unbalanced so as to have an advantageously, larger strength. If at least the bridge portions 45 disposed at the inner periphery of the core sheet 41 are formed so as to have a width larger than that of the strips 42, the core sheet 41 has a strength sufficient for practical use. When a plurality of the bridge portions 45 are provided in each of the slits 43, it is desirable for unbalanced strength that the bridge portions 45 be symmetrical with respect to quadrature-axis. As a result, since rotational strength of the core sheet 41 can be increased further, it is possible to produce a motor capable of withstanding high-speed rotation.

All the features of the third embodiment are applied to the core sheet 41 shown in FIG. 13. However, a portion of the features of the third embodiment may be, needless to say, applied to the core sheet 41 and such concrete examples are shown in FIGS. 18A to 18F.

(Fourth Embodiment)

Figure 19:
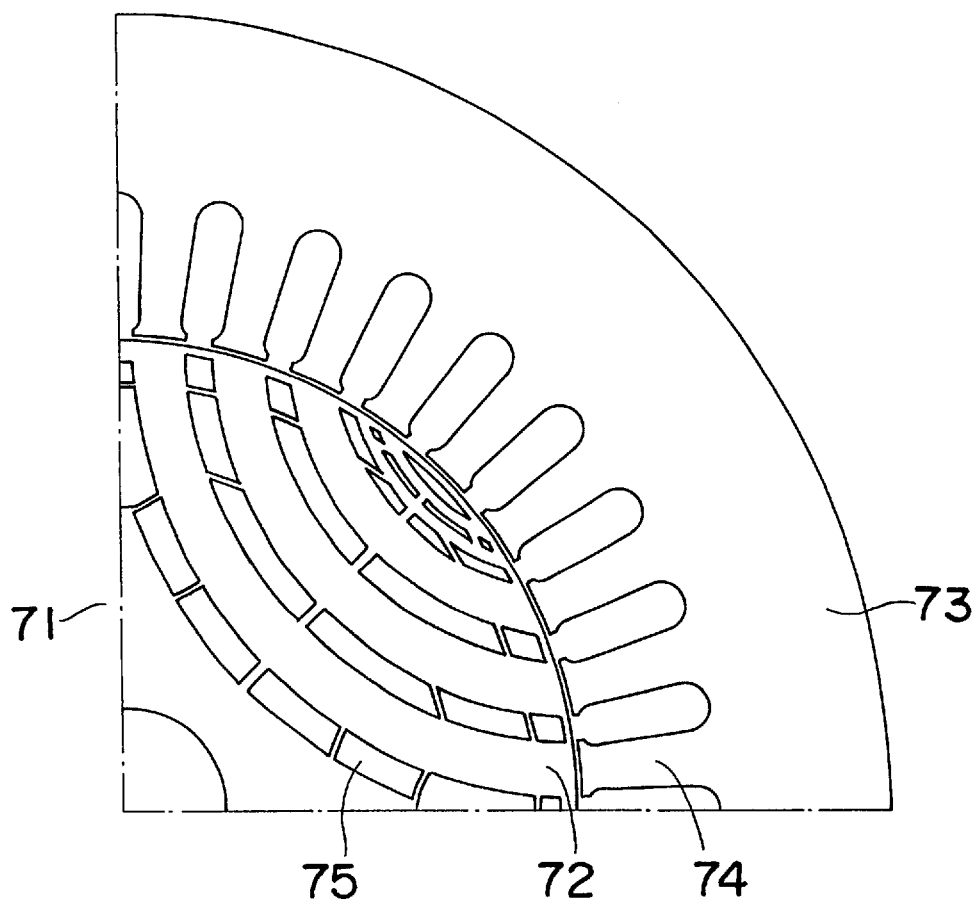
FIG. 19 is a fragmentary top plan view of a core sheet of a rotor core according to a fourth embodiment of the present invention.

FIG. 19 shows a core sheet 71 of a rotor core according to a fourth embodiment of the present invention. The core sheet 71 includes a plurality of strips 72 having a width corresponding to that of teeth 74 of a stator 73 such that the strips 72 confront the teeth 74, respectively, when the rotor core is set in the stator 73. Since other constructions of the core sheet 71 are similar to those of the core sheet 1 of the first embodiment, the description is abbreviated for the sake of brevity.

By the above described arrangement of the rotor core, the strips 72 of the core sheet 71 confront the teeth 74 of the stator 73, respectively, when the rotor core is set in the stator 73. Therefore, a quadrature-axis magnetic path, produced in the core sheet 71 when the core sheet 71 has been excited, traverses large slits 75 formed between the strips 72, and resistance against the quadrature-axis magnetic path is increased. However, since a direct-axis magnetic path is sufficiently secured by the strips 72 of the core sheet 71, resistance against the direct-axis magnetic path changes scarcely. Therefore, since a ratio of the direct-axis inductance Ld to the quadrature-axis inductance Lq, i.e., (Ld/Lq) can be increased, performance of a motor can be upgraded by obtaining a sufficiently large reluctance torque.

If a width of an outer peripheral rim at a stress concentration portion is made larger than that of the remaining portions of the outer peripheral rim, and bridge portions for coupling neighboring ones of the strips 72 are provided, the quadrature-axis magnetic path can be lengthened and thus, the resistance against the quadrature-axis magnetic path can be increased further.

Furthermore, if the slits 75 between the strips 72 are sealed by resin, rotational strength of the core sheet 71 can be increased further.

(Fifth Embodiment)

Figure 20:
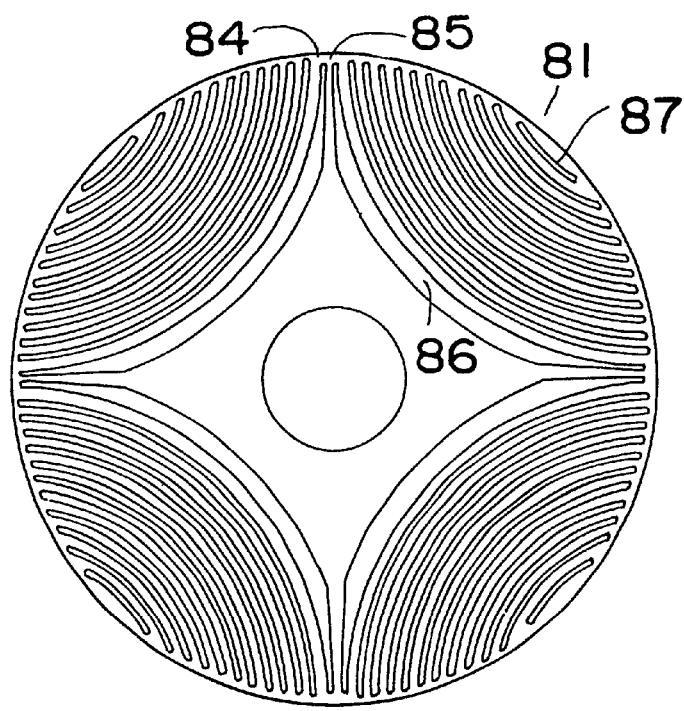
FIG. 20 is a top plan view of a core sheet employed in a rotor core according to a fifth embodiment of the present invention.
Figure 21:
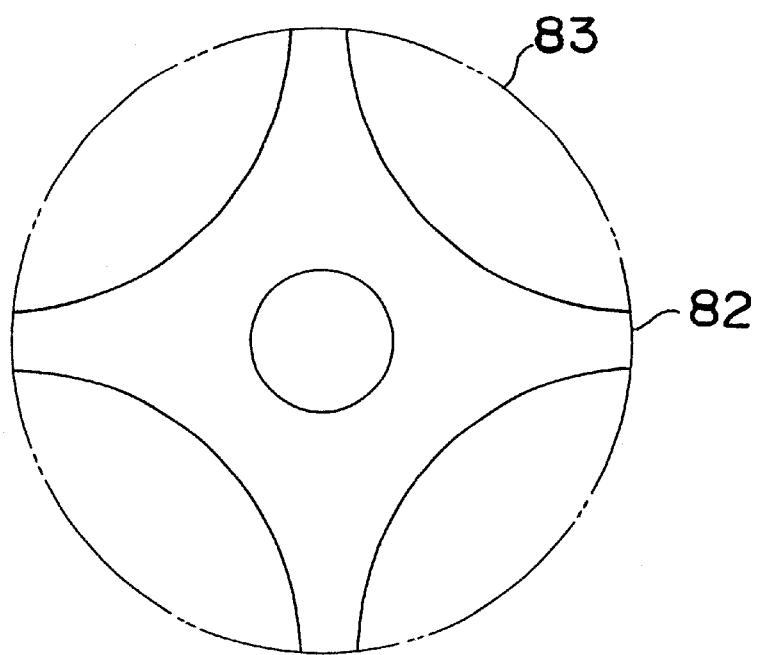
FIG. 21 is a top plan view of another core sheet employed in the rotor core of FIG. 20.

FIGS. 20 and 21 show core sheets 81 and 82 of a rotor core according to a fifth embodiment of the present invention, respectively. In this rotor core, the core sheets are constituted by the core sheets 81 and 82 made of material having high permeability such that the core sheets 82 are interposed among the core sheets 81. The core sheets 81 and 82 may also be arranged alternately. Alternatively, a plurality of the core sheets 82 may also be interposed between the core sheets 81. In the core sheet 81, a width of an outer peripheral rim 84 at a stress concentration portion 85 is made larger than that of the remaining portions of the outer peripheral rim 85, and a large slit 86 having a width larger than that of slits 87 is provided radially inwardly of a radially innermost one of the slits 87. Meanwhile, in the core sheet 82, outer peripheral portions, which are disposed in a quadrature-axis direction of a quadrature-axis magnetic path produced in the core sheet 81 when the core sheets 81 and 82 are excited, are removed as recesses 83.

Figure 22:
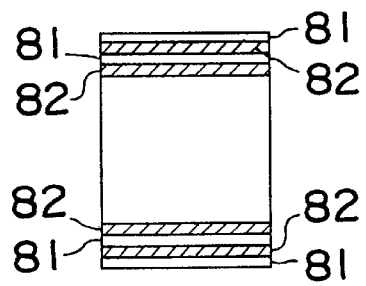
FIG. 22 is a sectional view of the rotor core of FIG. 20, showing an arrangement of the core sheets of FIGS. 20 and 21.
Figure 23:
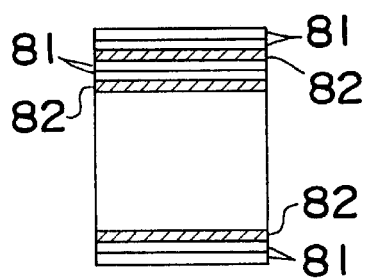
FIG. 23 is a sectional view of the rotor core of FIG. 20, showing another arrangement of the core sheets of FIGS. 20 and 21.

In this embodiment, the core sheets 81 and 82 are alternately arranged along the rotor shaft as shown in FIG. 22 but a plurality of, for example, two core sheets 81 may also be interposed between neighboring ones of the core sheets 82 as shown in FIG. 23.

By the above described arrangement of the rotor core, the core sheet 82, in which the outer peripheral portions disposed in the quadrature-axis direction of the quadrature-axis magnetic path produced in the core sheet 82 when the core sheets 81 and 82 are excited have been removed as the recesses 83, is interposed between the core sheets 81. Therefore, since the quadrature-axis magnetic path produced in the core sheets 81 passes through the recesses 83 of the core sheets 82, resistance against the quadrature-axis magnetic path is increased. On the other hand, since a direct-axis magnetic path is secured also in the core sheets 82, resistance against the direct-axis magnetic path changes scarcely. Accordingly, since the ratio of the direct-axis inductance Ld to the quadrature-axis inductance Lq, i.e., (Ld/Lq) can be increased, the reluctance torque T can increased from the formula (1) referred to earlier. By increasing the reluctance torque T sufficiently as described above, performance of a motor employing this rotor core can be upgraded.

(Sixth Embodiment)

Figure 24:
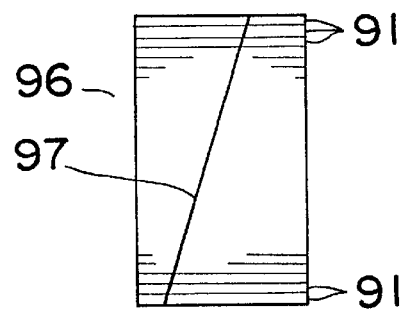
FIG. 24 is a sectional view of a rotor core according to a sixth embodiment of the present invention.

FIG. 24 shows a rotor core 96 according to a sixth embodiment of the present invention. In the rotor core 96, when a plurality of core sheets 91, which are each formed with a large slit (not shown) having a width larger than that of slits (not shown) and disposed radially inwardly of a radially innermost one of the slits are laminated along a rotor shaft (not shown), mounting positions of the core sheets 91 are shifted from one another in an axial direction of the rotor shaft such that the core sheets 91 are subjected to a linear skew 97. As a result, since resistance against a direct-axis magnetic path is uniform in a circumferential direction of the rotor core 96 by the skew 97, a direct-axis magnetic flux entering the rotor core 96 from the stator, or vice versa, is uniform, so that torque ripple caused by nonuniformity of the direct-axis magnetic flux is lessened and thus, performance of a motor employing the rotor core 96 can be upgraded further.

Figure 25:
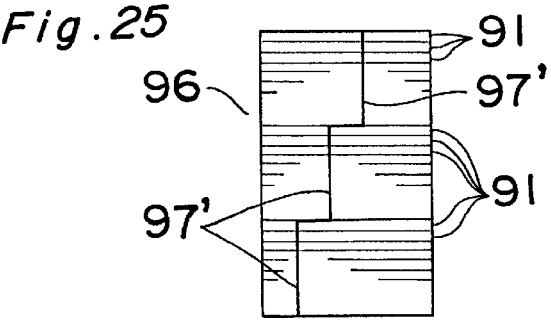
FIG. 25 is a sectional view of a first modification of the rotor core of FIG. 24.
Figure 26:
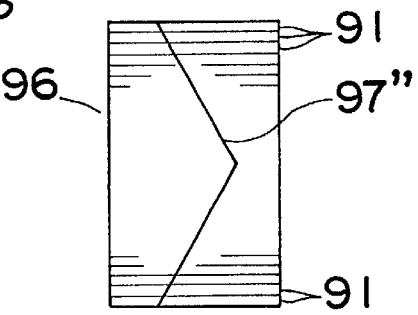
FIG. 26 is a sectional view of a second modification of the rotor core of FIG. 24.

The linear skew 97 of FIG. 24 may also be replaced by a steplike skew 97' shown in FIG. 25 or a V-shaped skew 97" bent in the course of the axial direction of the rotor shaft as shown in FIG. 26. According to investigations of the present inventors, the skew 97 is desirably set at an amount not more than a pitch of the teeth of the stator.

By subjecting the rotor core 96 to the skew 97 properly, performance of the motor employing the rotor core 96 can be upgraded further as described above. It is well known that even if the stator is subjected to a skew, performance of the motor can be improved by lessening torque ripple.

(Seventh Embodiment)

Figure 27:
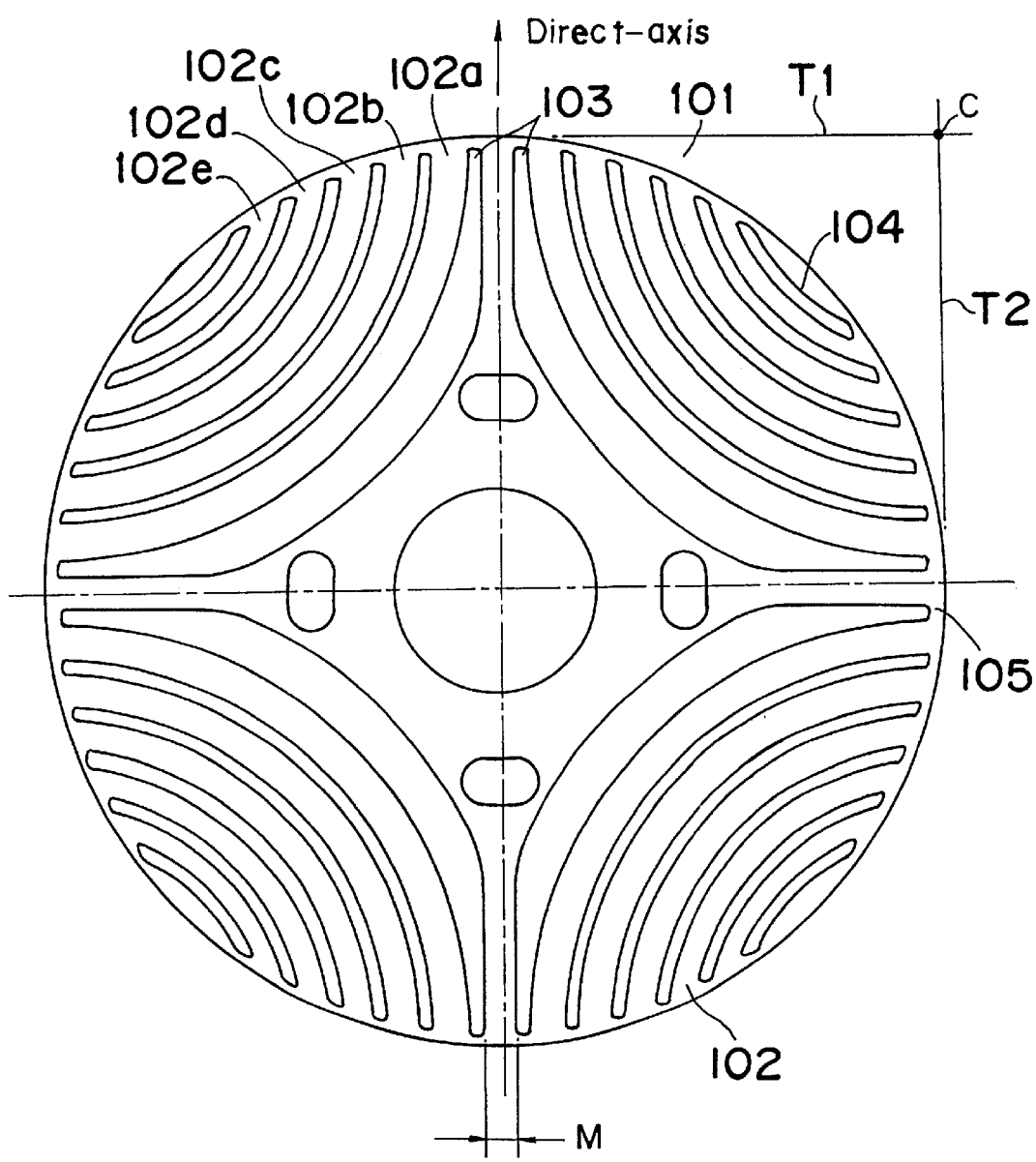
FIG. 27 is a top plan view of a core sheet of a rotor core according to a seventh embodiment of the present invention.

FIG. 27 shows a core sheet 101 of a rotor core according to a seventh embodiment of the present invention. In the core sheet 101, the width of strips 102 is gradually increased towards a center of the core sheet 101. Since the strips 102 include a first strip 102a, a second strip 102b, a third strip 102c, a fourth strip 102d and a fifth strip 102e sequentially arranged radially outwardly from the center of the core sheet 101, the first strip 102a has a maximum width, while the fifth strip 102e has a minimum width. Thus, a direct-axis magnetic path becomes larger towards the center of the core sheet 101 and becomes smaller towards an outer periphery of the core sheet 101. Furthermore, a large slit 103 having a width larger than that of slits 104 is provided radially inwardly of a radially innermost one of the slits 104.

Figure 28:
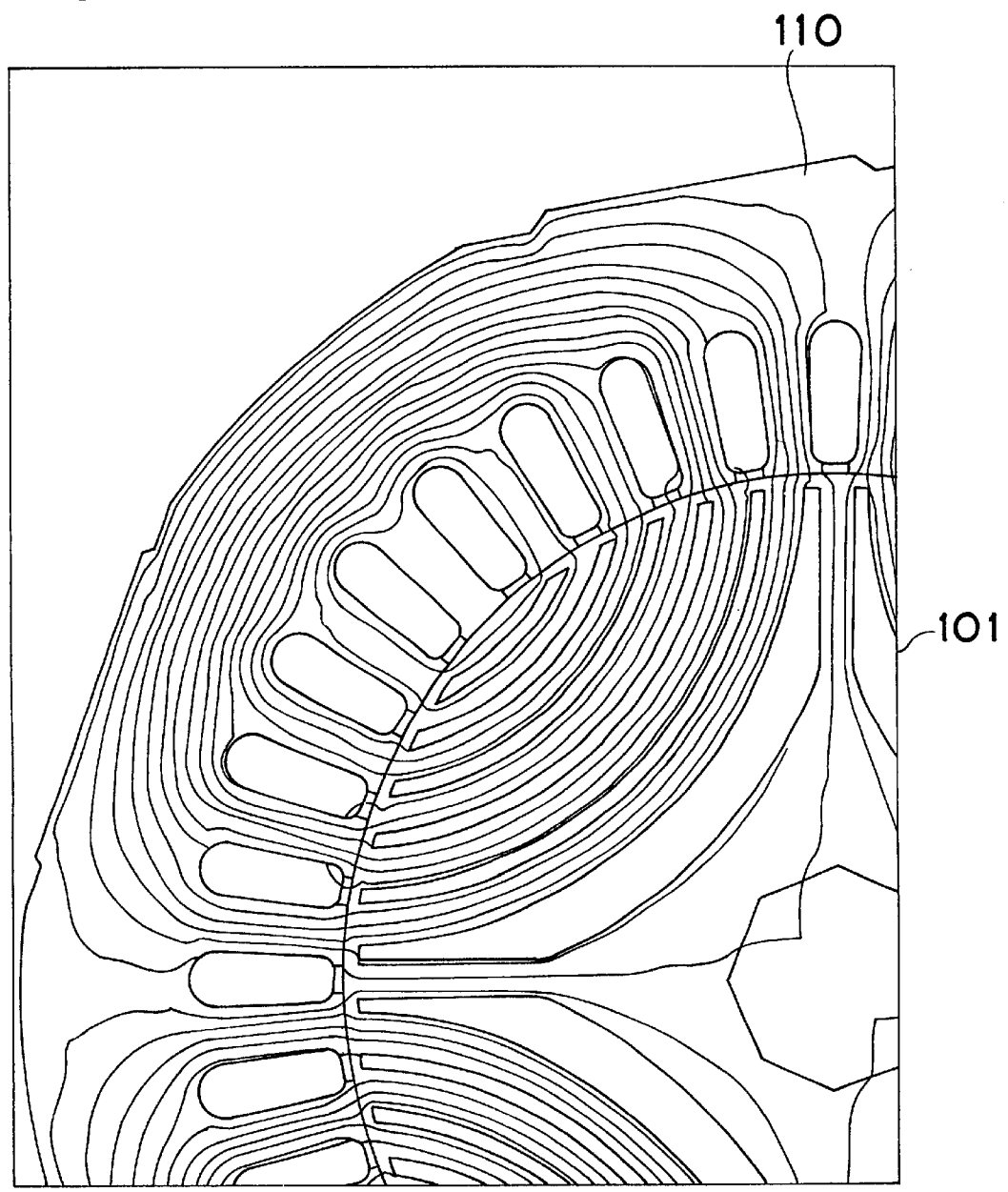
FIG. 28 is a magnetic field analytical diagram for the rotor core of FIG. 27.
Figure 29:
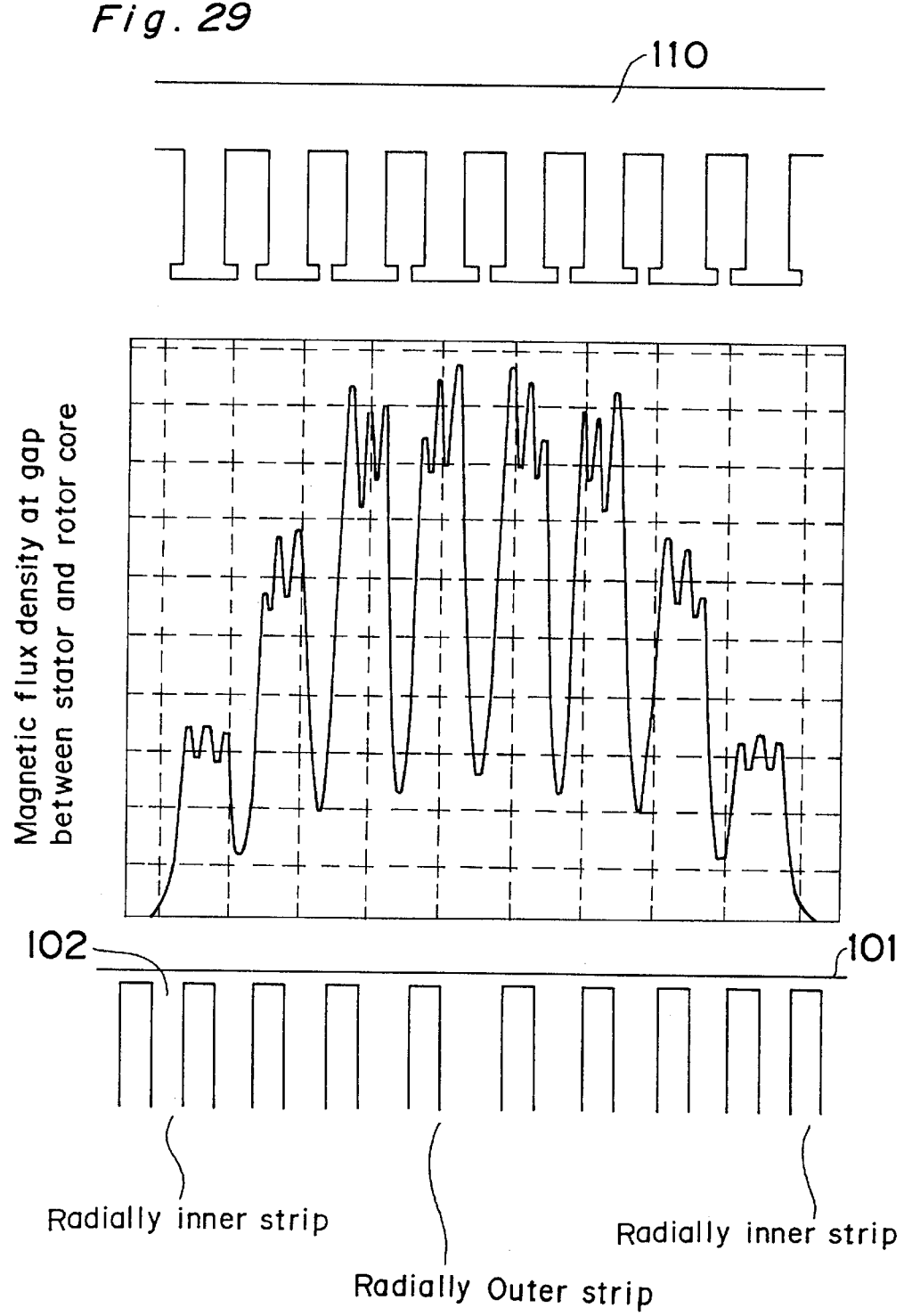
FIG. 29 is a diagram showing magnetic flux density at a gap between a stator and the rotor core of FIG. 27.

Without simultaneously generating an identical quantity of the magnetic flux from all the teeth of the stator, control is performed such that a larger quantity of the magnetic flux is inputted to the strips 102 closer to the center of the core sheet 101. Therefore, as shown in a magnetic field analytical diagram of FIG. 28, a larger quantity of the magnetic flux flows into the strips 102 closer to the center of the core sheet 101 set in a stator 110. A magnetic flux density at a gap between the stator 110 and the rotor core exhibits a sine wave as shown in FIG. 29.

If quantity of the magnetic flux from the stator 110 is increased by increasing electric current flowing through the stator 110 in order to obtain a high torque in the rotor core of this embodiment, a large quantity of the magnetic flux flows into the strips 102 close to the center of the core sheet 101. However, the first strip 102a is wider than the remaining strips 102b to 102e as described above. Therefore, even if a large quantity of the magnetic flux flows into the first strip 102a, magnetic saturation does not occur in the first strip 102a and thus, a large quantity of the magnetic flux can be inputted to the first strip 102a. Meanwhile, quantity of the magnetic flux flowing into the fifth strip 102e is smaller than that of the remaining strips 102a to 102d. Hence, even if the fifth strip 102e is made thinner than the remaining strips 102a to 102d, magnetic saturation is least likely to happen in the fifth strip 102e. Namely, in the rotor core of this embodiment, the strips 102 of the core sheet 101 are formed in accordance with quantity of the magnetic flux from the stator 110.

In one example of the core sheet 101, the core sheet 101 has a radius of 38.7±0.01 mm, the first strip 102a has a width of 3.1±0.05 mm, the second strip 102b has a width of 2.9±0.05 mm, the third strip 102c has a width of 2.6±0.05 mm, the fourth strip 102d has a width of 2.2±0.05 mm and the fifth strip 2e has a width of 1.7±0.05 mm. Four groups of the slits 103 and 104 each acting as a flux barrier are provided within 90° of the core sheet 101. An interval M between the large slits 103 is 2.8±0.05 mm, while an outer peripheral rim 105 has a width of 0.3 to 0.6 mm.

Width of the strips 102 of the core sheet 101 is made larger towards the center of the core sheet 101 and is made smaller towards the outer periphery of the core sheet 101 as described above. Therefore, in the rotor core in which the core sheets 101 are laminated, the direct-axis magnetic path becomes larger towards a center of the rotor core and becomes smaller towards an outer periphery of the rotor core.

Meanwhile, the first strip 102a disposed radially innermost in the strips 102 has the maximum width and width of the strips 102 is gradually reduced towards the outer periphery of the core sheet 101 as described above. This relation is most preferable for gaining effects of this embodiment. However, even when a radially inner one of the strips 102 is wider than a radially outer one of the strips 102, a width of the first strip 102a is larger than that of the second strip 102b, and the width of the second strip 102b is equal to that of the third strip 102c and that of the fourth strip 102d but is larger than that of the fifth strip 102e, the effects of this embodiment can be achieved.

Furthermore, since quantity of the magnetic flux flowing through each strip 102 is determined by its portion having a minimum width, width of each strip 102 is advantageously uniform in the direct-axis direction. Therefore, when one strip 102 has a narrow portion, quantity of the magnetic flux flowing through the strip 102 is determined by the narrow portion even if the strip 102 has also a wide portion. The requirement that the width of each strip 102 is uniform is determined only by the width of each strip 102, regardless of whether or not outer peripheral edges of the rotor core are coupled with each other and the strips 102 are coupled with each other for reinforcement.

In this embodiment, the strips 102 are provided in five rows in the core sheet 101. However, it is needless to say that the number of the rows of the strips 102 of the core sheet 101 is not restricted to five.

Figure 34:
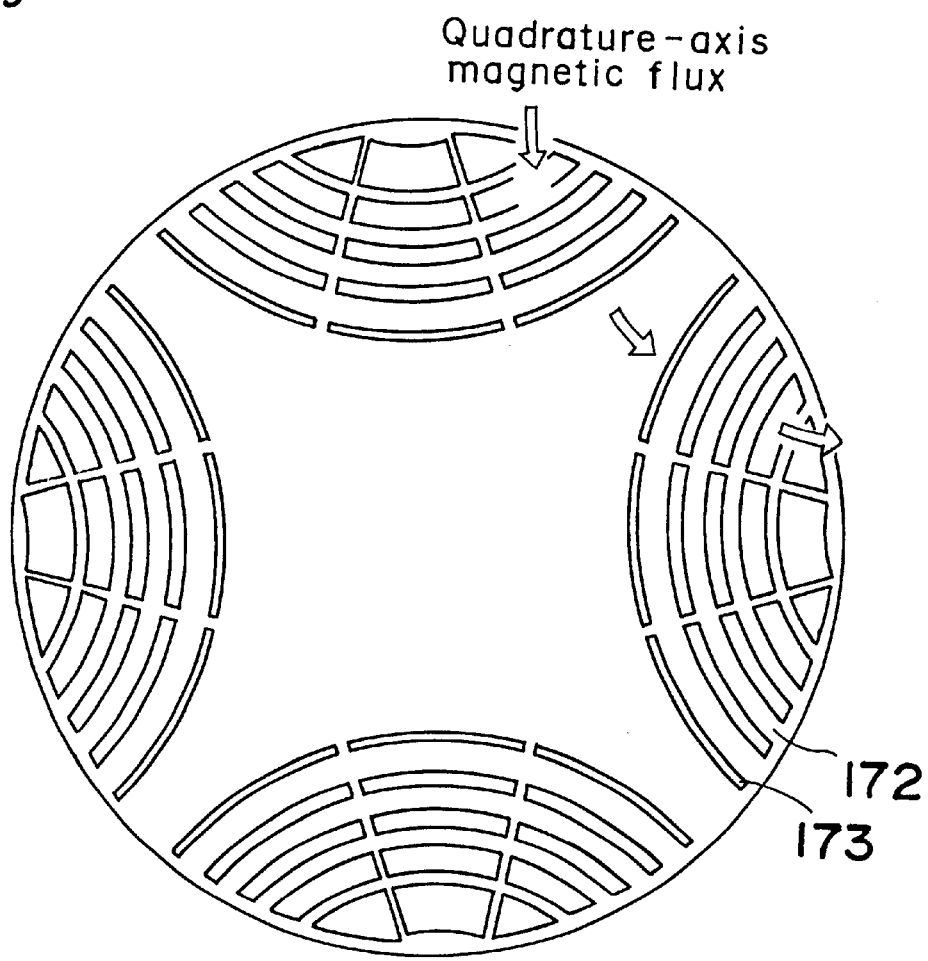
FIG. 34 is a top plan view of a core sheet of another prior art rotor core.

Meanwhile, Japanese Patent Laid-Open Publication No. 7-274460 (1995) discloses a rotor core in which when one of strips 172 is disposed inwardly of another one of the strips 172 in a radial direction of the rotor core, the one of the strips 172 has a width larger than that of the another one of the strips 172 as shown in FIG. 34. However, in this known rotor core, when one of slits 173 is disposed inwardly of another one of the slits 173 in the radial direction, the one of the slits 173 has a width smaller than that of the another one of the slits 173 as will be seen from FIG. 34. In this arrangement of the known rotor core, since the strips 172 are made wider towards a center of the rotor core in the radial direction, it is possible to restrain magnetic saturation at radially inner ones of the strips 172. However, since the slits 173 are made narrower towards the center of the rotor core in the radial direction, magnitude of magnetic flux intercepted by radially inner ones of the slits 173 decreases. Generally, magnitude of a quadrature-axis magnetic flux intercepted by the radially inner ones of the slits is larger than that intercepted by radially outer ones of the slits. Therefore, if the radially inner ones of the slits 173 are made narrower than the radially outer ones of the slits 173, the quadrature-axis inductance Lq increases, so that (Lq–Ld) decreases and thus, the resultant torque is reduced.

Figure 30:
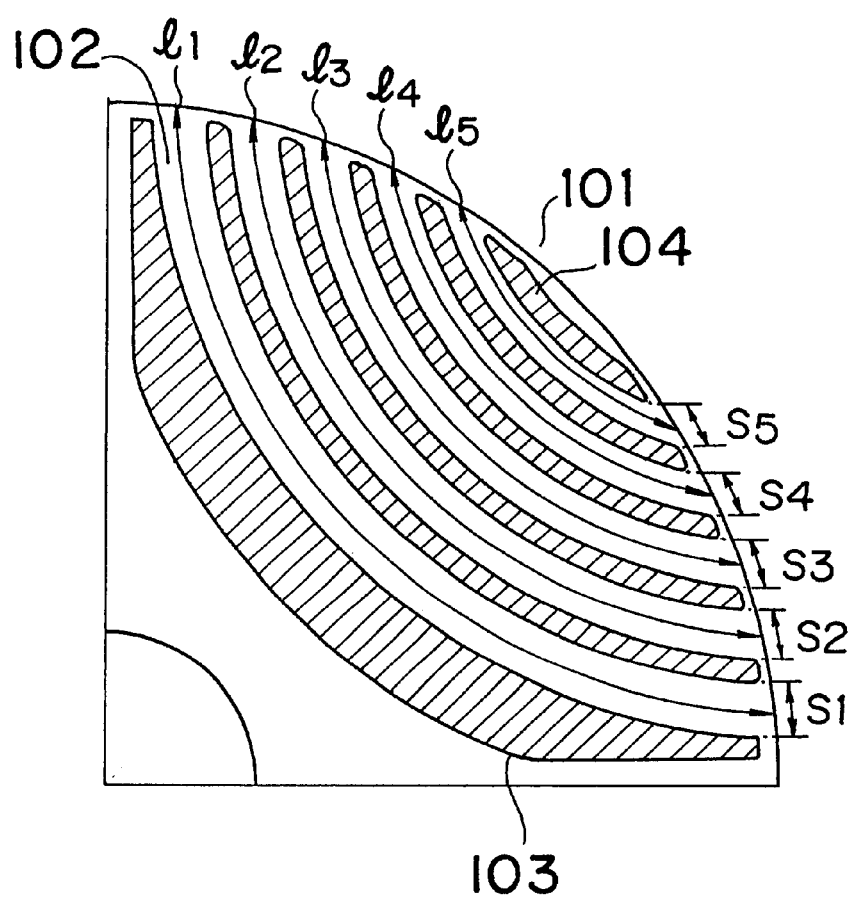
FIG. 30 is a fragmentary top plan view of the core sheet of FIG. 27.

On the other hand, in this embodiment, when one of the strips 102 is disposed inwardly of another one of the strips 102 in the radial direction of the rotor core, the one of the strips 102 has a width larger than that of the another one of the strips 102 in the radial direction. Therefore, when the first to fifth strips 102a to 102e have widths S1 to S5, respectively as shown in FIG. 30, a relation of (S1>S2>S3>S4>S5) is satisfied. Furthermore, when one of the slits 103 and 104 is disposed inwardly of another one of the slits 103 and 104 in the radial direction, the one of the slits 103 and 104 has a width not less than that of the another one of the slits 103 and 104 in the radial direction. Since radially inner ones of the strips 102 are made wider than radially outer ones of the strips 102, magnetic flux readily flows through the radially inner ones of the strips 102. In addition, since radially inner ones of the slits 103 and 104 are not less in width than radially outer ones of the slits 103 and 104, the quadrature-axis magnetic flux is intercepted greatly and thus, it is possible to provide a motor having high efficiency.

Meanwhile, since the radially inner ones of the strips 102 are made wider than the radially outer ones of the strips 102, width of the outer peripheral rim 105 can be made small for the following reason even if the rotor core is rotated at high speed. Namely, when the rotor core is rotated, weight of the radially outer ones of the strips 102 is applied to portions of the outer peripheral rim 105 corresponding to the radially inner ones of the strips 102. Therefore, since the radially outer ones of the strips 102 are not provided at an identical interval but are made narrow, weight of the radially outer ones of the strips 102 decreases. Accordingly, since the radially inner ones of the strips 102 are made wider than the radially outer ones of the strips 102, the width of the outer peripheral rim 105 can be made small, so that leakage of magnetic flux can be prevented and the quadrature-axis inductance can be increased and thus, efficiency of the motor can be raised.

Experiments conducted by the inventors of the present invention revealed that when the rotor core has a radius of 30 to 45 mm and the rotor core has the outer peripheral rim 105 ranging from 0.2 to 0.6 mm, the rotor case can be rotated at 6,000 r.p.m.

Meanwhile, as shown in FIG. 27, the slits 103 and 104 are arranged in four groups at an identical interval in a circumferential direction of the core sheet 101 such that the four groups of the slits 103 and 104 are symmetrical with respect to the center of the core sheet 101. Each of the groups of the slits 103 and 104 forms an angle of not more than 90° with the center of the core sheet 101 as shown in FIG. 30. By this arrangement, since a plurality of the flux barriers are balanced with each other, imbalance of the rotor core does not occur and thus, the rotor core can be rotated stably even at high speed.

Each of the slits 103 and 104 is curved so as to act as a flux barrier. When two straight lines T1 and T2 are tangent to the outer peripheral edge of the core sheet 101 as shown in FIG. 27, the straight lines T1 and T2 orthogonally intersect with each other at a point C, and the point C lies at a center of curvature of the slits 103 and 104. By this arrangement, the strips 102 have sufficient widths and short magnetic paths. Since reluctance of the strips 102 is proper for the widths of the strips 102, it is possible to provide a motor having high efficiency.

Although the present invention has been fully described in connection with the preferred embodiments thereof with reference to the accompanying drawings, it is to be noted that various changes and modifications are apparent to those skilled in the art. Such changes and modifications are to be understood as included within the scope of the present invention as defined by the appended claims unless they depart therefrom.

INDUSTRIAL APPLICABILITY

Since the rotor core can be rotated at high speed while the ratio (Ld/Lq) is kept high, it is possible to provide a motor having high efficiency and high output.

Efficiency and output of the motor can be further raised by having the width of the first outer peripheral rim portion be larger than the width of the second peripheral rim portion.

Since leakage of magnetic flux in the direct-axis direction is lessened, the ratio (Ld/Lq) can be kept high and thus, efficiency of the motor can be further raised.

Since strength of the slits is increased, width of the slits can be reduced further, so that it is possible to raise efficiency of the motor by keeping the ratio (Ld/Lq) low.

Since the diameter of the rotor core is set properly relative to the width of the outer peripheral rim, the rotor core can be rotated at high efficiency.

Since the direct-axis inductance Ld can be increased, the rotor core can be rotated at high speed while the ratio (Ld/Lq) is being kept high.

Furthermore, since the width of the slit is small in the vicinity of the outer periphery of the core sheet, direct-axis magnetic flux from the stator can readily enter the rotor core, so that the direct-axis inductance Ld can be increased and thus, the reluctance torque T of the motor can be increased.

When one strip is disposed radially inwardly of another strip, the one strip has a permeability larger than that of the another strip. Therefore, even if quantity of magnetic flux is increased, magnetic saturation does not occur in the vicinity of the central portion of the rotor core and thus, the motor can be rotated efficiently.

Since quantity of magnetic flux flowing through the strips increases and the quadrature-axis inductance Lq can be reduced, efficiency of the motor can be raised.

The rotor core having a small outer peripheral rim can be rotated highly efficiently even at a high speed of 6,000 r.p.m.

Since the flux barriers are well balanced with each other, the rotor core can be rotated stably even at high speed.

Since reluctance of the strips is minimized, efficiency of the motor can be raised.

When one strip is disposed radially inwardly of another strip, the one strip has a width larger than that of the another strip. Therefore, even if quantity of magnetic flux is increased in order to obtain large torque, magnetic saturation does not occur in the vicinity of the central portion of the rotor core and thus, the motor can be rotated efficiently.

Since the end portions of the slits are rounded, strength of the slits is increased further and thus, the rotor core can be rotated at high speed.

Since the bridge portions are provided in the slits, strength of the slits are increased, further and thus, the rotor core can be rotated at higher speed.

Since resistance against the quadrature-axis magnetic path can be increased, the motor can be rotated at higher speed and higher efficiency.

Strength of the rotor core can be increased when resin is filled into the slits.

By using the different kinds of the core sheets, it is possible to provide a motor having higher efficiency and higher output.

Cogging torque can be reduced when core sheets are laminated on one another in a skewed relationship.

It is possible to provide an electric vehicle capable of running safely at high speed by employing a motor having a rotor core as described herein.

What is claimed is:

1. A rotor core in which a plurality of core sheets are laminated on one another on a rotor shaft and a plurality of slits and a plurality of strips are alternately arranged in a radial direction of each of the core sheets so as to convexly confront a center of each of the core sheets such that an outer peripheral rim is formed between an outer peripheral edge of each of the core sheets and each of opposite ends of each of the slits, comprising:

a stress concentration portion which is provided at a portion of the outer peripheral rim and has a width that is larger than that of remaining portions of the outer peripheral rim.

2. The rotor core as claimed in claim 1, wherein the portion of the outer peripheral rim is formed by a first outer peripheral rim portion between the outer peripheral edge of each of the core sheets and each of opposite ends of a radially innermost one of the slits.

3. The rotor core as claimed in claim 1, wherein the portion of the outer peripheral rim is formed by a first outer peripheral rim portion between the outer peripheral edge of each of the core sheets and each of opposite ends of a radially innermost one of the slits, and a second outer peripheral rim portion between the outer peripheral edge of each of the core sheets and each of opposite ends of a radially second innermost one of the slits.

4. The rotor core as claimed in claim 3, wherein a width of the first outer peripheral rim portion is larger than a width of the second outer peripheral rim portion.

5. The rotor core as claimed in claim 1, wherein the portion of the outer peripheral rim is formed by a first outer peripheral rim portion between the outer peripheral edge of each of the core sheets and each of opposite ends of a radially innermost one of the slits, a second outer peripheral rim portion between the outer peripheral edge of each of the core sheets and each of opposite ends of a radially second innermost one of the slits, and a third outer peripheral rim portion between the outer peripheral edge of each of the core sheets and each of opposite ends of a radially third innermost one of the slits.

6. The rotor core as claimed in claim 1, wherein the strips are coupled with each other by only the outer peripheral rim.

7. The rotor core as claimed in claim 1, wherein some of the strips corresponding to the stress concentration portion are coupled with each other by only the portion of the outer peripheral rim.

8. The rotor core as claimed in claim 1, wherein end portions of each of some of the slits corresponding to the stress concentration portion are rounded.

9. The rotor core as claimed in claim 1, wherein when the rotor core has a radius of not less than 30 mm, the outer peripheral rim has a width of not less than 0.2 mm.

10. The rotor core as claimed in claim 1, wherein the width of the portion of the outer peripheral rim is not less than 1.5 times that of the remaining portions of the outer peripheral rim.

11. The rotor core as claimed in claim 1, wherein when the rotor core has a radius of not less than 20 mm, the outer peripheral rim has a width of not less than 0.1 mm.

12. The rotor core as claimed in claim 1, wherein end portions of each of the slits are rounded.

13. The rotor core as claimed in claim 1, wherein a bridge portion for coupling neighboring ones of the strips is provided on a corresponding one of the slits between the neighboring ones of the strips.

14. The rotor core as claimed in claim 13, wherein the bridge portion is provided at a center of the corresponding one of the slits.

15. The rotor core as claimed in claim 13, wherein the strips and the bridge portions are coupled with each other such that a zigzag magnetic path is formed by the strips and the bridge portions when the core sheets are excited.

16. The rotor core as claimed in claim 13, wherein a plurality of the bridge portions are provided on the corresponding one of the slits and an interval between neighboring ones of the bridge portions on the corresponding one of the slits is increased gradually as the corresponding one of the slits lies closer to a center of each of the core sheets.

17. The rotor core as claimed in claim 13, wherein when two of the slits lie next to each other in the radial direction, the bridge portion of one of the two of the slits is offset from that of the other of the two of the slits such that the bridge portions occupy corresponding positions on every other slit alternately.

18. The rotor core as claimed in claim 13, wherein when the core sheets are laminated on one another on the rotor shaft, a zigzag magnetic path is formed in each of the core sheets.

19. The rotor core as claimed in claim 13, wherein a width of the bridge portion is smaller than that of each of the strips.

20. The rotor core as claimed in claim 13, wherein a width of the bridge portion is increased gradually as the corresponding one of the slits lies closer to a center of each of the core sheets.

21. The rotor core as claimed in claim 13, wherein a radially innermost one of the slits has a width larger than that of a remaining one of the slits.

22. The rotor core as claimed in claim 13, wherein a plurality of the bridge portions are provided on corresponding ones of the slits, respectively, so as to be arranged linearly.

23. The rotor core as claimed in claim 13, wherein some of the slits correspond to the stress concentration portion, and the remaining portions of the outer peripheral rim are eliminated such that remaining portions of the slits open to the outer peripheral edge of each of the core sheets.

24. The rotor core as claimed in claim 1, wherein resin is filled into the slits.

25. The rotor core as claimed in claim 1, wherein the core sheets are constituted by first core sheets having outer peripheral portions disposed in a quadrature-axis direction and second core sheets whose outer peripheral portions disposed in a quadrature-axis direction are removed;

wherein the first core sheets are interposed among the second core sheets.

26. The rotor core as claimed in claim 25, wherein the first and second core sheets are arranged alternately.

27. The rotor core as claimed in claim 25, wherein a plurality of the first core sheets are interposed between the second core sheets.

28. The rotor core as claimed in claim 1, wherein when the core sheets are laminated on one another, mounting positions of the core sheets are shifted from one another in an axial direction of the rotor shaft such that the core sheets are subjected to a skew.

29. The rotor core as claimed in claim 28, wherein the skew is a step-like skew.

30. The rotor core as claimed in claim 28, wherein the skew is set at an amount not more than a pitch of teeth of a stator.

31. A motor employing a rotor core of claim 1.

32. A compressor employing a motor of claim 31.

33. An air-conditioner employing a motor of claim 31.

34. A refrigerator employing a motor of claim 31.

35. An electric vehicle in which a motor of claim 31 is employed as a drive unit for wheels.

* * * * *

UNITED STATES PATENT AND TRADEMARK OFFICE
CERTIFICATE OF CORRECTION

PATENT NO. : 6,259,181 B1
DATED : July 10, 2001
INVENTOR(S) : Shinichiro Kawano et al.

It is certified that error appears in the above-identified patent and that said Letters Patent is hereby corrected as shown below:

<u>Title page,</u>
Item [75], Inventors, delete "Noriyoshi Nishiyama"

Signed and Sealed this

Fifteenth Day of February, 2005

JON W. DUDAS
*Director of the United States Patent and Trademark Office*